(12) United States Patent
Takahama et al.

(10) Patent No.: US 6,323,995 B1
(45) Date of Patent: *Nov. 27, 2001

(54) OPTICAL ELEMENT SWITCHING DEVICE AND OPTICAL MICROSCOPE LOADED WITH THE DEVICE

(75) Inventors: Yasuteru Takahama, Hino; Mitsuhiko Saito, Hachioji; Sadashi Adachi, Hachioji; Tetsuya Shirota, Hachioji, all of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,043

(22) Filed: Mar. 12, 1999

(30) Foreign Application Priority Data

Mar. 17, 1998 (JP) .................................................. 10-067409

(51) Int. Cl.[7] .............................. G02B 21/00; G02B 7/18
(52) U.S. Cl. .......................... 359/371; 359/381; 359/388; 359/500; 359/821; 359/831
(58) Field of Search ..................................... 359/368, 370, 359/371, 381, 384, 386, 388, 500, 821, 831, 837

(56) References Cited

U.S. PATENT DOCUMENTS

| | | | |
|---|---|---|---|
| 2,435,953 | * 2/1948 | Bennett ................................ | 359/500 |
| 2,924,142 | * 2/1960 | Nomarski ............................. | 359/371 |
| 4,643,540 | * 2/1987 | Kawasaki et al. .................... | 359/368 |
| 4,661,692 | * 4/1987 | Kawasaki .............................. | 359/381 |
| 5,128,808 | * 7/1992 | Dosaka .................................. | 359/381 |
| 5,260,825 | * 11/1993 | Nagano et al. ....................... | 359/368 |
| 5,276,550 | * 1/1994 | Kojima ................................. | 359/368 |
| 5,396,063 | * 3/1995 | Ito et al. ............................... | 359/384 |
| 5,648,869 | * 7/1997 | Ikoh ..................................... | 359/381 |
| 5,703,714 | * 12/1997 | Kojima ................................. | 359/368 |
| 5,706,127 | * 1/1998 | Saito et al. ........................... | 359/368 |

FOREIGN PATENT DOCUMENTS 63-133115  6/1988  (JP) .
2556098  8/1997  (JP) .

* cited by examiner

*Primary Examiner*—Jon Henry
(74) *Attorney, Agent, or Firm*—Frishauf, Holtz, Goodman, Langer & Chick, P.C.

(57) ABSTRACT

An optical element switching device is provided wherein a plurality of optical elements are held by a guide mechanism for guiding them to move straight or rotate and arranged on a turret, and positioned by a positioning part comprising a spring for pushing a ball into V grooves formed at a rotarys shaft of the turret rotated by a first motor wherein, a selected one of the optical elements is stopped in an optical path (i.e. an optical axis of objectives), and wherein the optical element is moved by a second motor along a direction in which it is guided by the guide mechanism, so that corrections such as adjustment of the contrast and the like are automatically executed at switching operations.

9 Claims, 18 Drawing Sheets

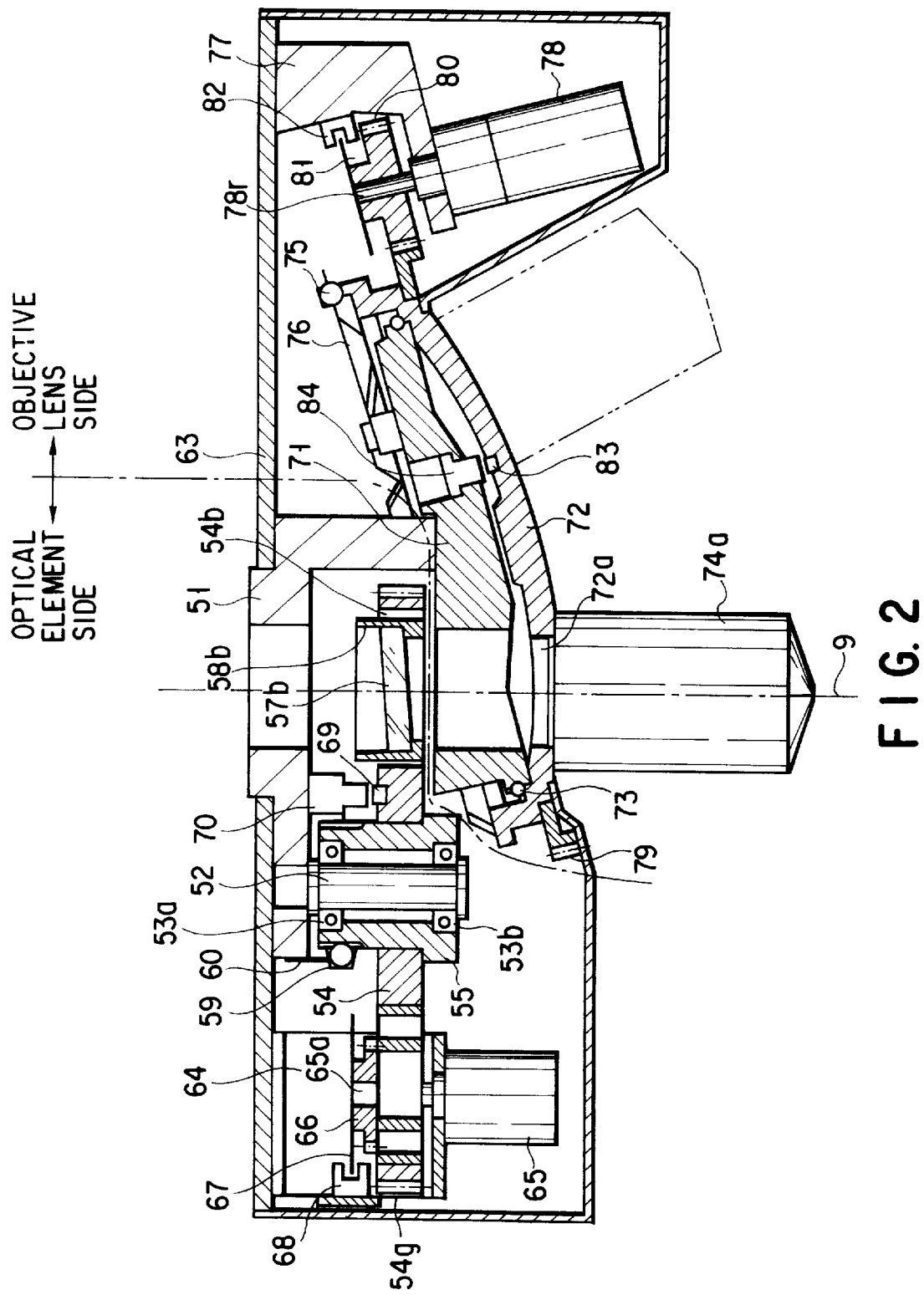
F I G. 2

| STATE | TYPE OF PRISM | HOLE ELEMENT | |
|---|---|---|---|
| | | 70a | 70b |
| 1 | 57a | ○ | ○ |
| 2 | 57b | ● | ○ |
| 3 | 57c | ● | ● |
| 4 | 58d (VACANT) | ○ | ● |

| METHOD OF MICROSCOPIC INQUIRY / OPTICAL ELEMENT | REFLECTION | | | | | TRANSMISSION | | | |
|---|---|---|---|---|---|---|---|---|---|
| | LIGHT FIELD | DARK FIELD | DIFFERENTIAL INTERFERENCE | POLARIZATION | CONFOCAL | LIGHT FIELD | DIFFERENTIAL INTERFERENCE | POLARIZATION | PHASE DIFFERENCE |
| DIC PRISM (IN DIC TURRET 125) | | | ○ | | | | ○ | | |
| CUBE (13G) FOR LIGHT FIELD | ○ | | ○ | ○ | ○ | ○ | ○ | ○ | ○ |
| CUBE (13G) FOR DARK FIELD | | ○ | | | | | | | |
| POLARIZER (FOR REFLECTION 135) | | | ○ | ○ | | | | | |
| AN TURRET (127) AN | | | ○ | ○ | | | ○ | ○ | |
| AN TURRET (127) 1/4λ | | | | | ○ | | | | ○ |
| AN TURRET (127) VACANT | ○ | | | | | ○ | | | |
| ND FILTER (FOR REFLECTION 130) | ○ | ○ | | | | | | | |
| OPTICAL ELEMENT TURRET (147) DIC PRISM | | | | | | | ○ | | |
| OPTICAL ELEMENT TURRET (147) RING SLIT OPENING | | | | | | ○ | | | ○ |
| OPTICAL ELEMENT TURRET (147) VACANT | | | | | | ○ | ○ | | |
| POLARIZER (FOR TRANSMISSION 145) | | | | | | | | ○ | |
| ND FILTER (FOR TRANSMISSION 139) | | | | | | ○ | | ○ | |

FIG. 17

OPTICAL ELEMENT SWITCHING DEVICE AND OPTICAL MICROSCOPE LOADED WITH THE DEVICE

BACKGROUND OF THE INVENTION

The present invention relates to an optical element switching device for automatically switching parts necessary for various microscopic inquiries, and to an optical microscope loaded with the device.

When optical elements are switched in a conventional manner, the operator manually inserts or removes the optical elements required for various microscopic inquiries of the light field, dark field, differential interference and the like. For example, in a case of the reflection-type differential interference microscopic inquiry, a polarizer, a Nomarski prism, an analyzer and the like need to be inserted into an optical path, in addition to the generally employed light field microscopic inquiry.

The polarizer is an optical element inserted into an illuminated optical path to convert illumination light into linearly polarized light in a specific vibration direction. The Nomarski prism is an optical element for splitting the linearly polarized light which has passed through the polarizer into two linearly polarized light beams of mutually orthogonal vibration directions and overlapping again two reflected light beams from an observed specimen. One Nomarski prism common to the illumination light and the observation light is necessary in the case of the reflection observation, and a pair of Nomarski prisms for the illumination light and the observation light are necessary in the case of the transmission observation. The analyzer is an optical element for aligning the luminous fluxes which have passed through the Nomarski prism in the same vibration direction and interfering the luminous fluxes.

Further, a moving mechanism or a rotating mechanism is provided to vary the background color and adjust the contrast. The moving mechanism moves the Nomarski prism in a direction orthogonal with the optical axis. The rotating mechanism rotates the polarizer or the analyzer, in a plane orthogonal with the optical axis, relatively to a ¼-wavelength plate arranged near the plane. Generally, the contrast is adjusted by manually operating the operation units of the moving mechanism and the rotating mechanism.

However, it is not preferable to use only one Nomarski prism for all of the objectives. If Nomarski prisms of different amounts of sharing (i.e. an amount of splitting two orthogonal linearly polarized light beams) are used in accordance with objectives used for observation, the contrast can be made more properly. For this reason, two or more Nomarski prisms are often switched for use, in accordance with the selected objectives.

In addition, the Nomarski prism is arrange, with its localization position set at the pupil position of the objective. At the localization position of the prism, two orthogonal linearly polarized light beams cross each other. For this reason, the position of the Nomarski prisms in the direction of the optical axis needs to be moved when objectives of different pupil positions are switched for use.

Generally, switching the Nomarski prisms in accordance with the switching of the objectives is operated manually by the user of the microscope.

For example, Utility Model Registration Publication No. 2556098 discloses a microscope of Nomarski interference contrast type as shown in FIGS. 23 and 24. This microscope comprises turrets 3 having a Nomarski prism 1 for an objective of a small magnifying power and a Nomarski prism 2 for an objective of a high magnifying power, a lifting mechanism for vertically moving the turrets 3 via gears 5 and 6 by turning a knob 4, and a switching mechanism for rotating the turret 3 and selecting the Nomarski prism in accordance with the magnifying power of the objective to be used.

According to this microscope, two Nomarski prisms 1 and 2 can be used separately by rotating the turret 3.

In addition, since the Nomarski prisms 1 and 2 are arranged so that lateral center lines of the Nomarski prisms 1 and 2 are arranged in the circumferential direction of the turret 3, the background color can be changed by rotating the turret 3 minutely. Also, the back-focus position (i.e. the pupil position) of each of the objectives and the localized position of the Nomarski prisms can be made coincide with one another by vertically moving the turret 3 by means of the lifting mechanism.

In the microscope, however, the interference colors are varied by only rotating the turret 3 minutely. In this case, the Nomarski prisms are moved while drawing arcs along the rotation of the turret 3. When the background color is varied, the optical axes of the Nomarski prisms are displaced in a normal direction to the vibration direction of the polarizer and the analyzer and the inherent optical performance cannot be achieved.

Moreover, when the Nomarski prism for the objective of a lower magnifying power is switched to that for the objective of a higher magnifying power by rotating the turret 3 together with switching of the objectives, and vice versa, adjusting again the background color to that observed before switching requires much labor.

In addition, since the amounts of sharing are different in accordance with the types of Nomarski prisms, the rate of variation of the background color to the rotation of the turret is varied in accordance with the types of the prisms, which gives a sense of incongruity to the observer.

Furthermore, although the background color to be observed by the observer, i.e. the retardation position is almost determined, the sensitivity in the drive of the prism cannot be varied at a position where the observation is required or a position where the observation is not required, and thereby it cannot be said that the microscope has definitely good operability.

For example, Jpn. Pat. Appln. KOKAI Publication No. 63-133115 discloses a microscope in which various microscopic inquiries can be selected by inserting various optical members into an optical path or removing them therefrom.

This microscope has a memory unit, an instructing unit and an inserting/removing control unit. The memory unit stores an inserted/removed state of the optical members corresponding to the respective microscopic inquiries. The instructing unit outputs instruction signals corresponding to the microscopic inquiries instructed by the operations of operation members. The inserting/removing control unit reads from the memory unit the inserted/removed states of the respective optical members corresponding to the microscopic inquiries instructed in response to the instruction signals and outputs signals to control the insertion of the optical members into an inserting/removing unit or removal of the optical members therefrom.

According to this microscope, labor required to manually insert the optical members into an optical path or remove them therefrom as seen in the prior art can be saved and a desired microscopic inquiry can be automatically selected by the only operations of the operation members.

In Jpn. Pat. Appln. KOKAI Publication No. 63-133115, however, a microcomputer instructs the insertion/removal control by reading the inserted/removed states of the various optical members at the time of differential interference observation, which are stored in the memory circuit, and consequently the optical members such as the Nomarski prisms, the polarizing plate and the ¼-wavelength plate corresponding to the objectives in the optical path are inserted into the optical path.

At the time of the differential interference observation, the moving mechanism for moving the Nomarski prisms in a direction orthogonal with the optical axis, and the rotating mechanism for rotating the polarizer or the analyzer, in a plane orthogonal with the optical axis, relatively to the ¼-wavelength plate arranged in the vicinity of the plane, as mentioned above, are required in order to adjust the contrast by changing the background color. But, the technique is not disclosed in this patent publication and it cannot be judged whether or not an invention described in the patent publication can be accomplished.

In addition, the system of rotating the polarizer or the analyzer in order to change the background color can be easily motorized comparatively, but has a drawback that its optical performance is inferior with respect to the points mentioned below, as compared with a system of moving the Nomarski prisms.

First, since the amount of variation in the phase difference can be kept in a range of $-\lambda/2$ to $+\lambda/2$, background colors in the sensitive color area cannot be obtained.

Secondly, since the light passing through the polarizer and the ¼-wavelength plate is not a completely circular polarized light because of the influence of a half mirror for introducing the illumination light, the contrast is worsened.

Thirdly, since the ¼-wavelength plate has an effect which any ¼-wavelength plate should have in an only specific wavelength and the wavelength is shifted from the ¼ wavelength in the other wavelength range, coloring occurs.

Finally, in accordance with a wedge angle which an element has, an image is displaced with the rotation of the element.

BRIEF SUMMARY OF THE INVENTION

The present invention aims to provide an optical element switching device, in a structure capable of achieving the optical performance at the differential interference observation to the maximum extent, which allows switching of the microscopic inquiries and adjustment at the time of the observation to be executed automatically and which does not give a sense of incongruity in adjusting the background colors to the observer, and also provide an optical microscope loaded with the optical element switching device.

In order to achieve the object, the present invention provides an optical element switching device, comprising a turret which is rotatably provided on a stationary substrate and on which one or more of optical elements are arranged; a driving mechanism for rotating the turret; a transmission mechanism for transmitting a rotary force of the driving mechanism to the turret; a positioning unit for positioning a selected one of the optical elements on the rotating turret to stop at a predetermined position in an optical path of an optical system; a guide mechanism for holding the optical element on the turret to move straight or revolve; an optical element moving mechanism provided on the stationary plate, for moving the optical element stopping in the optical path, along the moving direction of the guide mechanism; and a control unit for controlling operations of the mechanisms.

Further, the optical element moving mechanism, which is provided at a stationary portion of the optical element switching device, moves the optical element positioned in the optical path when the turret is positioned at a predetermined position by the positioning unit.

In the optical element switching device having the structure described above, the driving mechanism rotates the turret and selectively arranges the optical element at a position determined to the optical path of the objectives. Further, the optical element is moved in a desired distance, in a predetermined direction, on the turret by the optical element moving mechanism, and also the contrast is adjusted or other necessary corrections are executed at the switching operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing a sectional structure of the optical element switching device according to a first embodiment;

FIG. 17 is a view showing an example of inserting of the optical elements of respective switching units into an optical path and removing the optical elements therefrom, in the second embodiment;

DETAILED DESCRIPTION OF THE INVENTION

Embodiments of the present invention will be described in detail with reference to the figures.

Figure 1A:
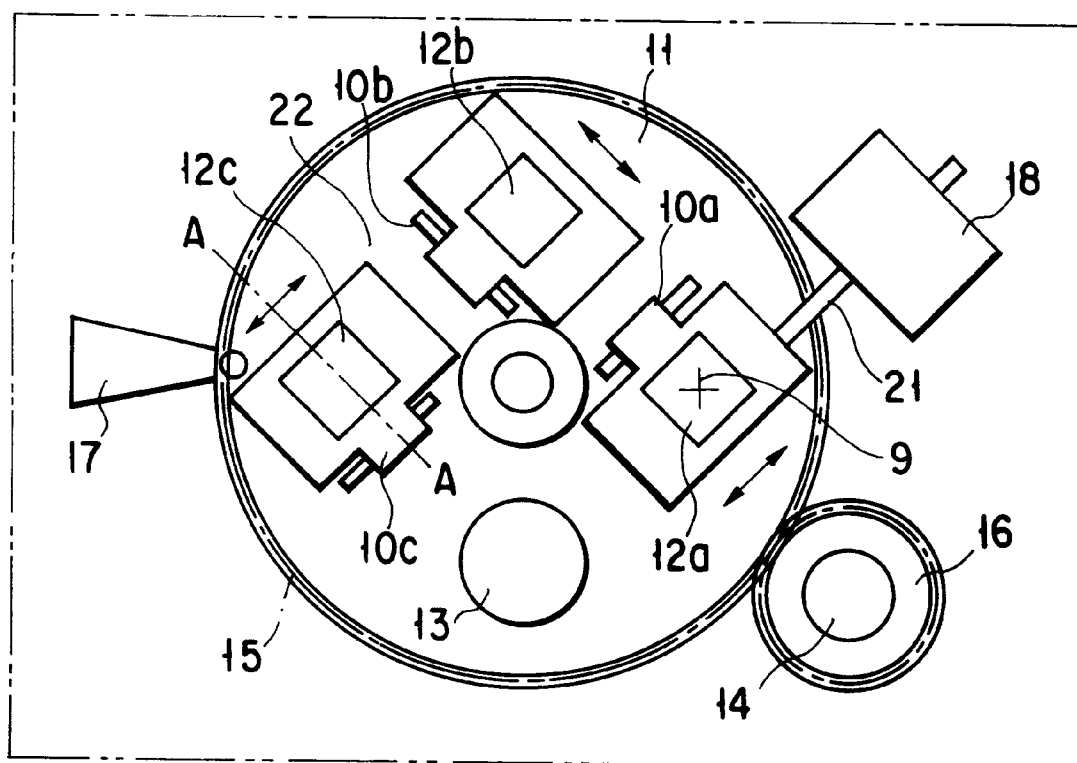
FIG. 1A is a view showing a schematic structure of an optical element switching device according to the present invention.
Figure 1B:
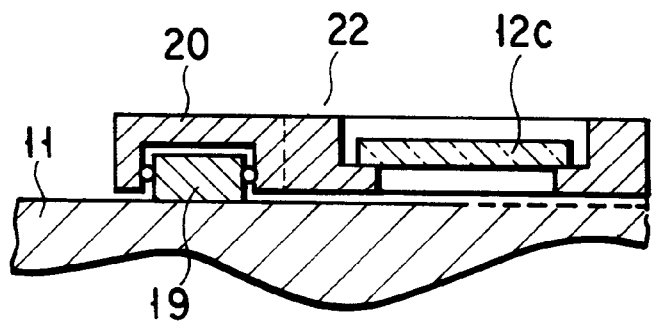
FIG. 1B is a view showing a sectional structure of an optical element having a guide mechanism shown in FIG. 1A.

FIG. 1A is a view showing a schematic structure of an optical element switching device according to the present invention, and FIG. 1B is a view showing a sectional structure of an optical element having a guide mechanism seen along a line A—A of FIG. 1A.

This optical element switching device is constituted by optical elements 12a, 12b and 12c supported respectively by guide mechanisms 10 so as to be capable of moving straight along the guide direction, a turret 11 at which a hole 13 is formed, a motor 14 for rotating the turret 11, a pinion gear 16 provided at a rotary shaft of the motor 14 to engage with a gear 15 provided on the outer periphery of the turret 11, a click stop mechanism 17 for determining a stopped position of the turret 11, and a motor 18 for moving the optical element 12 mounted in an optical path 9 (i.e. an optical axis of objectives described later) along the direction of the movement of the guide mechanism 10 by the click stop mechanism 17.

The click stop mechanism 17 positions the turret 11 to stop prisms 22 of the optical elements 12a, 12b and 12c, and the hole 13 in the optical path 9, and stopping members are provided at locations based on the stop positions which divide the outer periphery of the turret 11 into four equal parts. FIG. 1A shows a case where the optical element 12a is positioned in the optical path 9.

The guide mechanisms 10a, 10b and 10c are constituted by rectangular stationary portions 19 which are fixed at the turret 11 and have V-shaped grooves at both sides, and moving portions 20 provided movably at the V-shaped grooves via bearings. The frame portions 22 fitted in prisms 12 are constituted integrally with the moving portions 20.

The optical element 12 can be moved straight along the guided direction by the guide mechanism 10. A shaft 21 of the motor 18 is pushed out to push the moving portion 20 or a predetermined portion of the frame portion 22, and thereby the optical element 12 is moved. An especial member may be provided at a portion on which the shaft 21 abuts. The shaft 21 is not coupled to the moving portion 20, the frame portion 22 or the optical element 12.

A spring or the like is attached to the optical element 12 so that the moved optical element 12 can return to its initial position when the pushed shaft 21 retreats. The optical element 12 is kept at its initial position on the turret 11 unless it is moved by the motor 18. As for the member for returning the optical element 12 to its initial position, an elastic member of magnet and rubber, or a power spring can be used as well as the spring.

In this optical element switching device, the turret 11 is rotated by the motor 14, any one of the three optical elements 12a, 12b and 12c and the hole 13 is selected, the stop position of the turret 11 is determined by the click stop mechanism 17 and the turret 11 is stopped, and the selected one of the optical elements 12a, 12b and 12c and the hole 13 is arranged in the optical path 9. The optical element 12 arranged in the optical path 9 is moved by the motor 18 along the guided direction (represented by an arrow) of the guide mechanisms 10a, 10b and 10c.

At this time, for example, when the microscope is loaded with the optical element switching device, contrasts and the like are adjusted and corrected for preferable conditions of observation.

Figure 3:
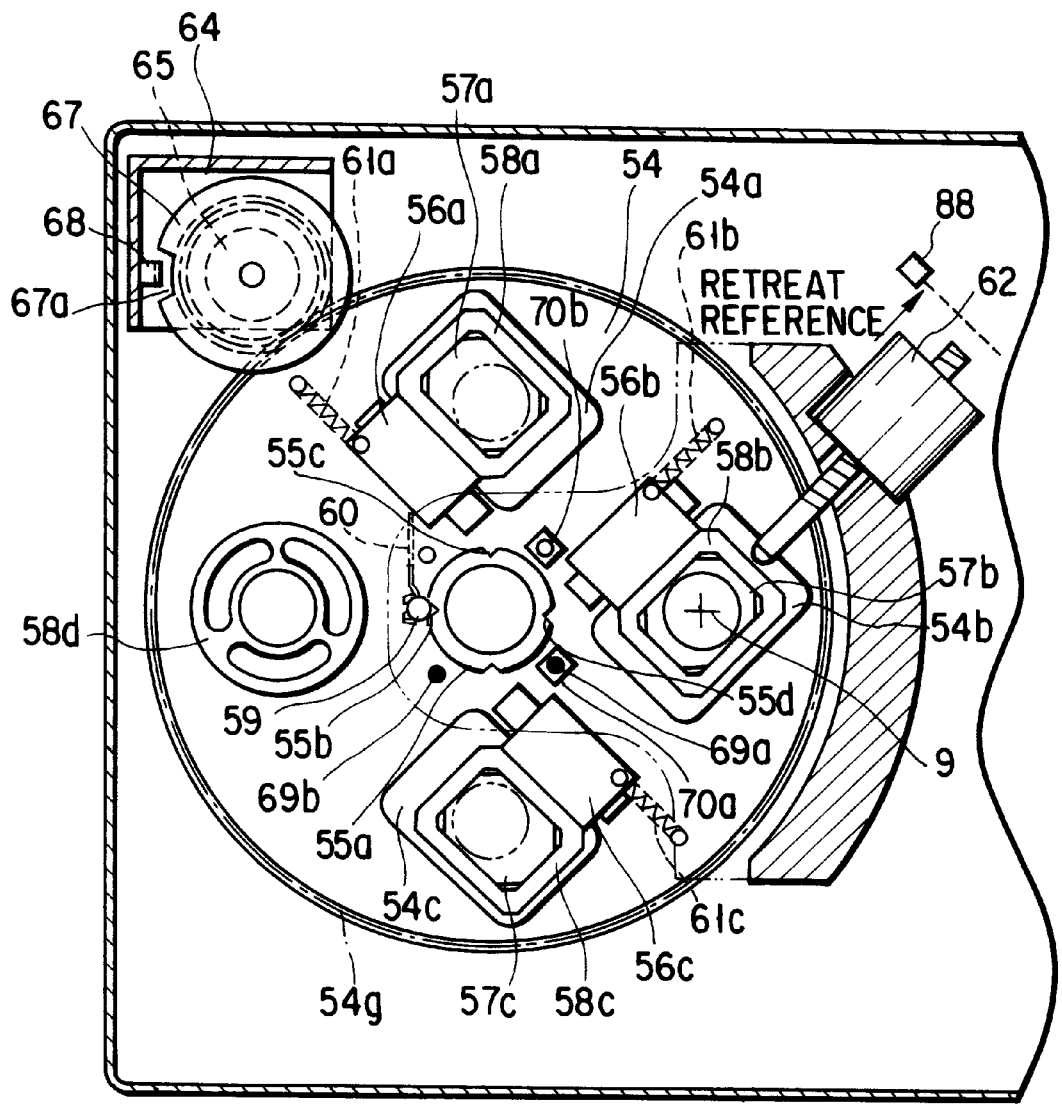
FIG. 3 a view showing essential parts of the optical element switching device according to the first embodiment.

FIG. 2 shows a sectional structure of the optical element switching device according to the first embodiment of the present invention, and FIG. 3 shows a plane structure of essential parts of the optical element switching device.

FIG. 2 shows an optical element switching device 32 constituted integrally with an objective switching device 31 for selecting one of a plurality of objectives to position it in the optical axis.

In the optical element switching device 32, a stationary shaft 52 is fixed at an attachment member 51 which is to be loaded on a microscope. A rotary member 55 is rotatably attached to the stationary shaft 52 via bearings 53a and 53b. A turret 54 is attached to the rotary member 55.

Three direct-acting guides 56a, 56b and 56c are attached at an angle of 90 degrees on the turret 54, and prism frames 58a, 58b and 58c are held at movable portions of the direct-acting guides 56a, 56b and 56c, respectively. Nomarski prisms 57a, 57b and 57c of different types are fixed at the prism frames 58a, 58b and 58c, respectively. The Nomarski prisms 57a, 57b and 57c can be moved in a straight direction (i.e. the guide direction), in opening portions 54a, 54b and 54c of the turret 54, respectively. In the present embodiment, each of the direct-acting guides is attached at an angle of 90 degrees, but is not limited to this.

Further, a cylindrical member 58d which is arranged in the optical path 9 at observations other than the observation of the Nomarski differential interference and has openings at its center and peripheral portions of the center, is provided on the turret 54.

Four V-shaped grooves 55a, 55b, 55c and 55d are provided at the outer peripheral portion of the rotary member 55 so as to make an angle of 90 degrees between two of the grooves. A click spring 60 whose distal end portion pushes a ball 59 into the V-shaped groove with a spring force, is provided on the side of the attachment member 51.

The V-shaped grooves 55a, 55b, 55c and 55d, the ball 59, and the click spring 60 serve as a positioning unit for determining the stop position of the rotating turret 54 at every 90 degrees.

With this structure, the rotating turret 54 can be stopped at an angle of 45 degrees in the optical path 9 by the cylindrical member 58 and the Nomarski prisms 57a, 57b, 57c and 57d.

Next, extension springs 61a, 61b and 61c fixed on the turret 54 are attached to one-end sides of movable portions of the direct-acting guides 56a, 56b and 56c, respectively, and are always extended toward the external direction of the turret 54. When a shaft top end portion of a linear stepping motor 62 described later does not contact the prism frame, the prism frame is kept at its initial position.

A linear stepping motor 62 whose shaft advances or retreats while rotating is mounted at the attachment member 51 in a direction making an angle of 45 degrees. When any one of the prism frames 58a, 58b and 58c is arranged in the optical path 9 by the above-mentioned positioning unit, the Nomarski prisms 57a, 57b and 57c are moved by pushing the arranged prism frame with the shaft end portion.

When the shaft end of the linear stepping motor 62 is driven in a direction of retreating from the moved Nomarski prisms 57a, 57b and 57c, the shaft end separates from the prism frames 58a, 58b and 58c which it has contacted during the retreating, and the linear stepping motor 62 is stopped at a reference position by a reference position sensor 88 which functions as a limit sensor.

On the other hand, a motor 65 for rotating the turret 54 via a motor table 64 is provided on a base plate 63 provided at the attachment member 51 and extended. A pinion gear 66 engaging with a gear 54g provided at the outer peripheral portion of the turret 54 and a disc 67 having a cutaway portion 67a are attached to rotary shaft 65a of the motor 65. A photosensor 68 such as a photo-interrupter for sensing the rotary state of the disc 67 is arranged on the motor table 64.

The disc 67 and the photosensor 68 constitute an engagement sensor for sensing a state of the turret 54 engaged with the prism. When the turret 54 is positioned by the positioning unit, the cutaway portion 67a of the disc 67 is sensed by the engagement sensor 68 without fail.

Two magnets 69a and 69b for recognizing the rotary position of the turret 54 are arranged over the turret 54. Two hole sensors 70a, 70b are provided below the attachment member 51 to face the magnets 69a and 69b, respectively. Four signals based on combination of the hole sensors 70a and 70b are output in accordance with the facing states of the magnets 69a, 69b and the hole sensors 70a, 70b. In FIG. 3, a black circle represents the presence of the magnet and a white circle represents the absence of the magnet.

A method of recognizing the rotary position of the turret 54 by the magnets 69a, 69b and the hole sensors 70a, 70b, will be explained with reference to FIG. 4.

Figures 4, 9:
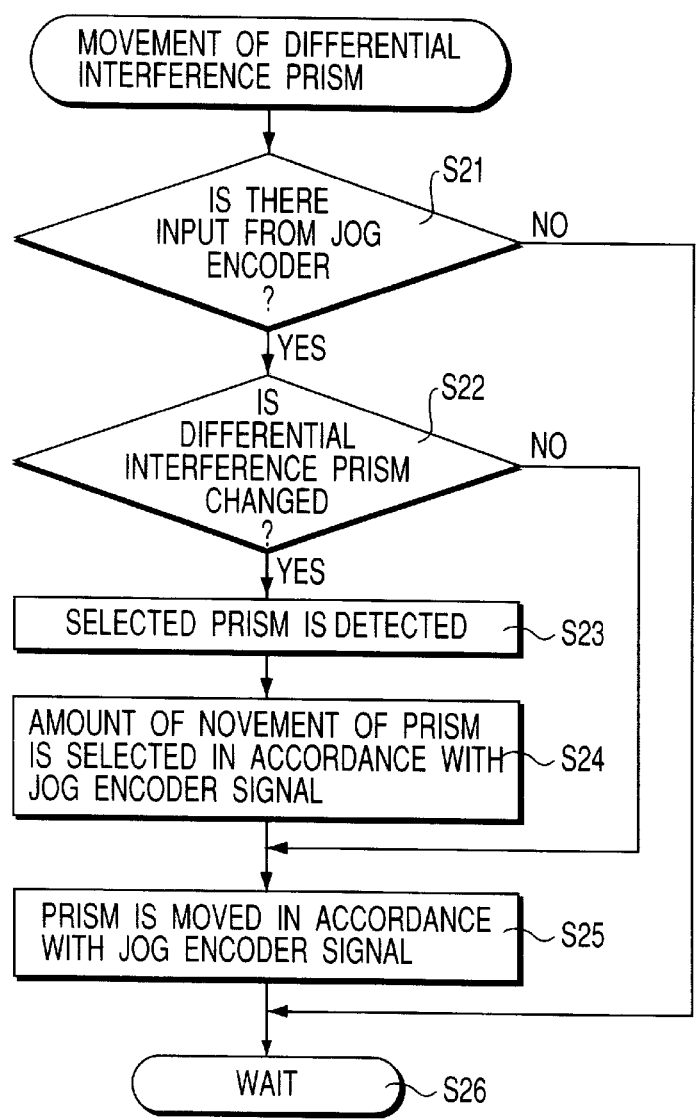
FIG. 4 is a view explaining a method of recognizing a rotary position of a turret in the first embodiment.
FIG. 9 is a flow chart explaining a first example of adjustment of the background color in the first embodiment.

First, when the Nomarski prism 57a is arranged in the optical path 9, the magnet 69a or 69b is not detected by the hole sensors 70a and 70b (State 1 in FIG. 4).

When the Nomarski prism 57b is arranged in the optical path 9 (in the state shown in FIG. 3), only the magnet 69a is detected by the hole sensor 70a to be turned on (State 2 in FIG. 4).

When the Nomarski prism 57c is arranged in the optical path 9, the magnets 69a and 69b are detected by the hole sensors 70a and 70b, respectively, to be turned on (State 3 in FIG. 4).

When the Nomarski differential interference observation is not executed, i.e., when the cylindrical member 58d is arranged in the optical path 9, only the magnet 69b is detected by the hole sensor 70b to be turned on (State 4 in FIG. 4).

Thus, the rotary position of the turret 54 can be recognized by four output signals, in accordance with the combination of the signals of the hole sensors 70a and 70b.

Figure 5:
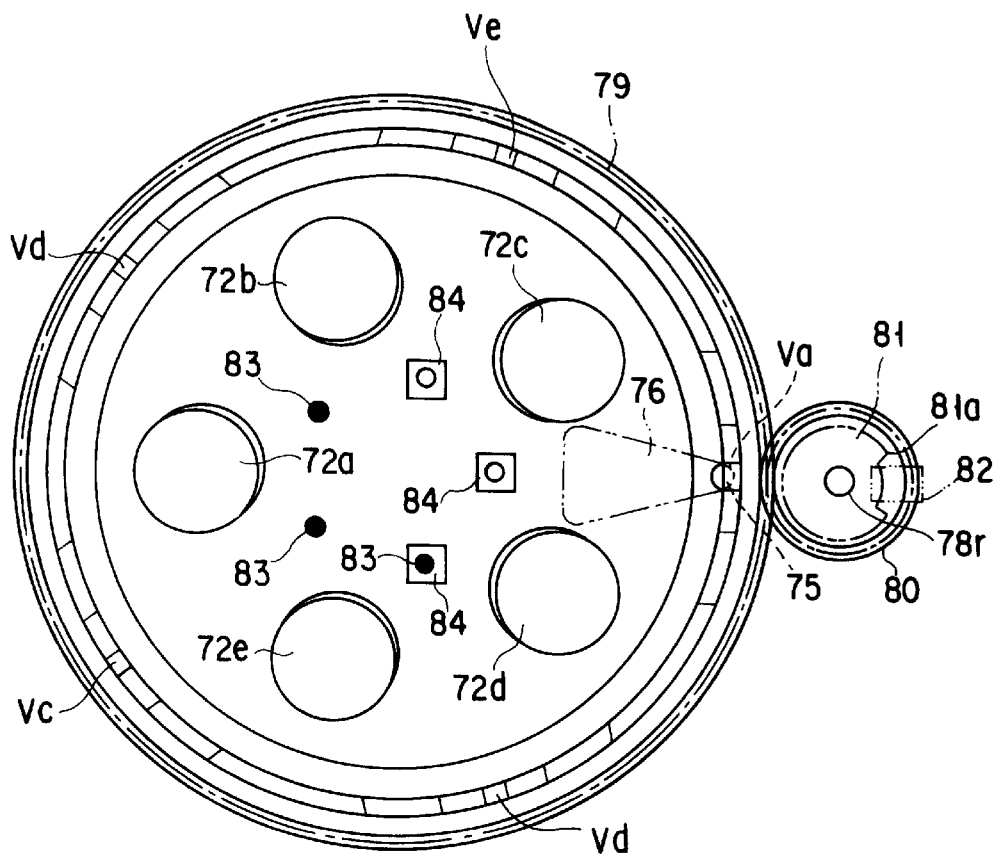
FIG. 5 is a view showing a structure of an objective switching device.

Next, a structure of the objective switching device will be explained with reference to FIGS. 2 and 5.

A revolver 72 is rotatably supported by a support member 71 fixed on the above-mentioned attachment member 51, via a number of balls 73 that also function as guides. The revolver 72 has objective attachment portions 72a to 72e at which a plurality (five in this case) of objectives 74a to 74e having different magnifying powers can be loaded. Engagement grooves Va to Ve corresponding to the objective attachment portions 72a to 72e are formed at five portions of the outer periphery of the revolver 72.

On the other hand, a leaf spring 76 having a click ball 75 fixed at its top end is fixed on the upper surface of the support member 71. The leaf spring 76 effects to push the click ball 75 into the engagement grooves Va to Ve of the outer periphery of the revolver 72. When the click ball 75 is engaged with the engagement grooves Va to Ve, the respective objectives 74a to 74e provided on the revolver 72 correspond exactly to the optical path 9. The leaf spring 76 and the click ball 75 constitute engagement portions which make contact with a predetermined engaging force, between the revolver 72 and the support member 71.

A motor 78 is attached to the base plate 63 via a motor table 77. A gear 79 for reducing the rotary speed of the motor 78 and transmitting the rotation to the revolver 72 is provided on the outer periphery of the revolver 72, so as to be engaged with a gear 80 fixed on a rotary shaft 78r of the motor 78.

A disc 81 having a cutaway portion 81a is attached to the gear 80. A photosensor 82 such. as a photo-interrupter is attached to the motor table 77 so as to face the disc 81. The disc 81 and the photosensor 82 constitute stop sensors for generating a stop position signal of the revolver 72. When the click ball 75 is engaged with the engagement grooves Va to Ve on the outer periphery of the revolver 72, the photosensor 82 detects the cutaway portion 81a of the disc 81.

Further, three indication elements, for example, indication magnets 83 are attached to the revolver 72. In addition, three sensors, for example, hole elements 84 for sensing the magnetism are attached on the periphery of the support member 71 facing the indication magnets 83. The indication magnets 83 and the hole elements 84 constitute type sensors for identifying the objective attachment portions 72a to 72e.

A method of identifying the objective attachment portions 72a to 72e is the same as that explained in FIG. 4 except for the difference between 2 bits and 3 bits, and its explanation is omitted here.

Figure 6:
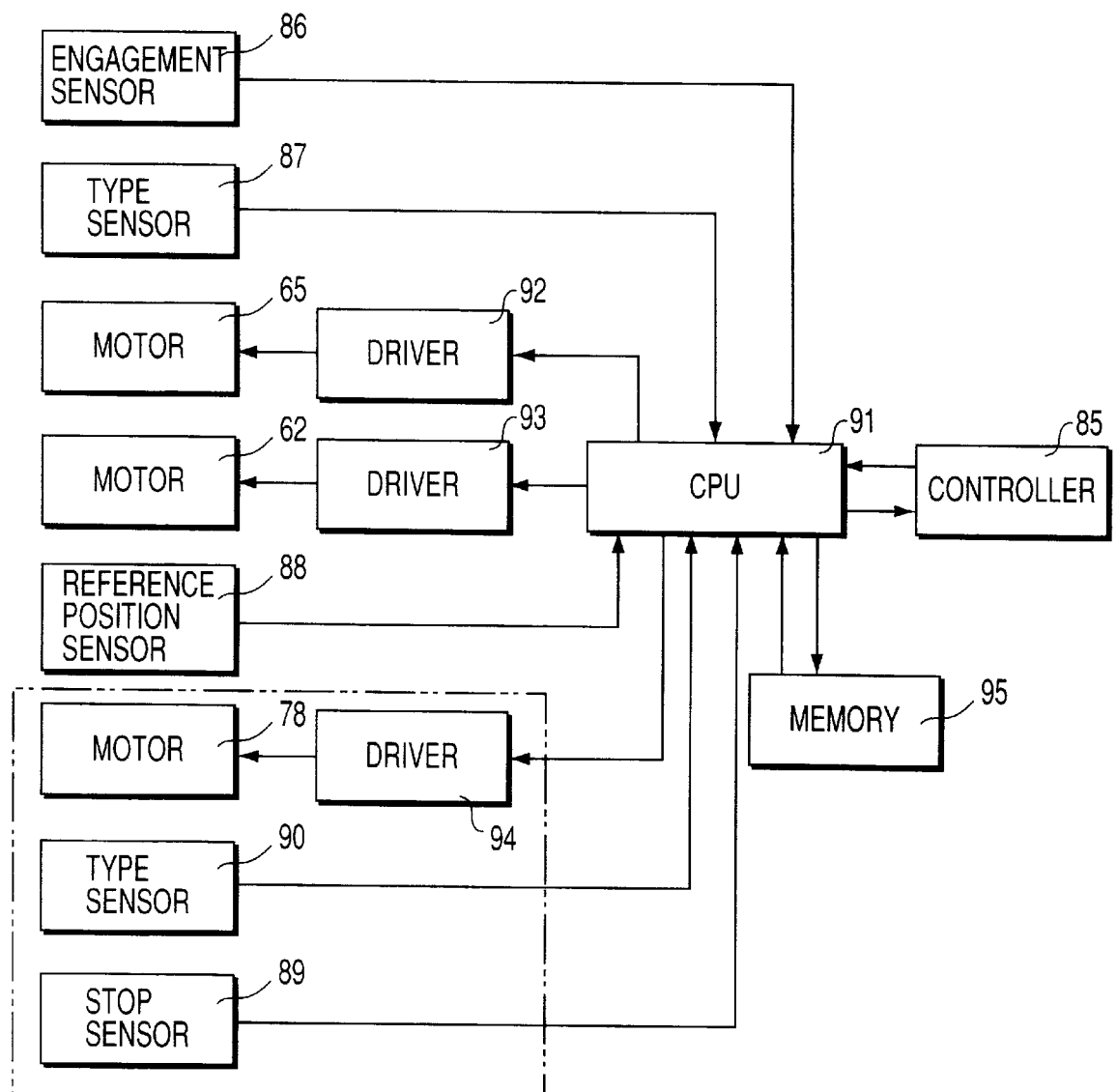
FIG. 6 is a view showing a circuit structure of the optical element switching device according to the first embodiments.

Next, FIG. 6 schematically shows the circuit structure of the optical element switching device according to the present embodiment.

In the present embodiment, a controller 85, an engagement sensor 86, a type sensor 87 and a reference position sensor 88 are connected to a CPU 91. The motors 65 and 62 are connected to the CPU 91 via drivers 92 and 93, and an objective switching device 21 is also connected thereto.

The CPU 91 drives the motors 62, 65 and 78 via the drivers 92, 93 and 94, in accordance with drive control signals based on the signals detected by the sensors.

The objective switching device 21 is constituted by the motor 78 for the revolver to switch the objectives, the driver 94 for driving the motor 78, a type sensor 90 for discriminating the type of the objective, and a stop sensor 89 for detecting the stop position of the rotation of the revolver.

Figure 7:
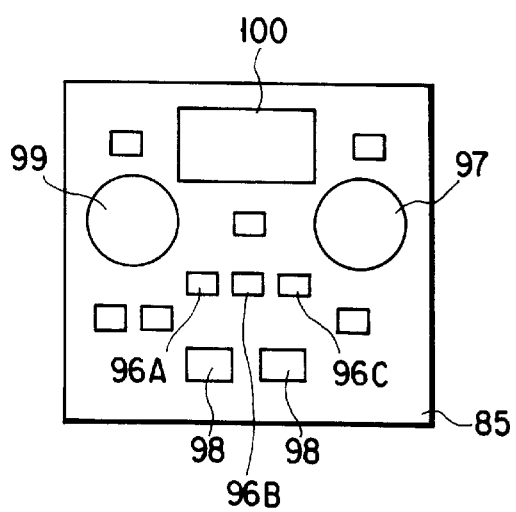
FIG. 7 is a view showing an example of a structure of a controller in the optical element switching device according to the first embodiment.

The controller 85 comprises a switch 96C for Nomarski observation instruction, a jog encoder 97 for instruction of the amount of the drive of the prism, switches 96A and 96B for instruction of microscopic switching, a switch 98 for instruction of switching the objectives, a jog encoder 99 for instruction of the amount of the drive of the stage, a display unit 100 for displaying the states of the parts of the microscope, and the like, as shown in FIG. 7. In addition, a memory 95 for storing information about the parts of the microscope as occasion requires, is connected to the CPU 91.

The operations of the present embodiment thus constituted, will be explained with reference to a flow chart of FIG. 8.

First, when the operator operates the switch of the controller 85 and an instruction to switch the objectives is input (step S1), and the CPU 91 judges the direction of the rotation of the motor 78 and supplies an instruction to rotate the motor 78 to the driver 94 (step S2).

After the motor 78 has started, it is judged whether or not the motor 78 reaches the stop position of the revolver 72 by a signal from the stop sensor 89 (step S3). If it is judged that the motor 78 is at the stop position (YES), the CPU 91 supplies an instruction to stop the motor 78 to the driver 94 and thereby the motor 78 is stopped (step S4).

Next, simultaneously with the stop of the motor 78, the CPU 91 confirms the type of the objective after the switching, in accordance with the output of the type sensor 90 (step S5). After the confirmation, the CPU 91 judges whether or not the Nomarski prism different from that employed before the switching needs to be employed (step S6). If the CPU 91 judges the necessity (YES), the CPU 91 supplies a drive instruction to the driver 93 to make the linear stepping motor 62 for positioning the Nomarski prism retreat to the limit position (i.e. the reference position) (step S7).

When the CPU 91 confirms that the linear stepping motor 62 has retreated to the limit position from the output of the reference position sensor 88 (step S8), the CPU 91 stores the number of the drive pulse of the linear stepping motor 62 in the memory 95 (step S9). After that, the CPU 91 supplies a drive instruction to the driver 92 to drive the motor 65 for rotating the turret 54 (step S10).

Next, the CPU 91 judges whether or not a desired Nomarski prism is positioned in the optical path 9 from the output of the type sensor 87 (step S11). If the desired Nomarski prism is positioned in the optical path 9 (YES), the CPU 91 detects that the desired Nomarski prism is in the engaging range of the turret 54 (step S12). If this is detected (YES), the CPU 91 supplies a signal which makes the motor 65 stop to the driver 92 so as to stop the motor 65 (step S13).

Simultaneously with the stop of the motor 65, the CPU 91 confirms the type of the Nomarski prism again by the type sensor 87 (step S14), reads the number of the pulse of the linear stepping motor 62 which has been stored in the memory, and supplies an instruction to the driver 93 to return the linear stepping motor 62 to its initial position (step S15).

After the linear stepping motor 62 has returned to its initial position, the CPU 91 allows a display unit of the controller 85 to display the type of the switched objective and the type of the Nomarski prism (step S16).

After such a sequence of the switching operations have been completed, the present device waits until a next switching instruction is input (step S17).

When a background color is to be changed, the jog encoder 99 is operated. This operation will be explained below.

FIG. 9 is a flow chart showing a first example of adjustment of the background color.

First, the CPU 91 judges whether or not there is an input signal from the jog encoder 99 (step S21). If there is the input signal (YES), the CPU 91 detects whether or not the differential interference prism has been changed (step S22). Then the CPU 91 detects the type of the prism selected by the type sensor 87 and arranged in the optical path 9 (step S23). In accordance with the type of the sensed Nomarski prism in the optical path 9, the CPU 91 selects and reads the amount of drive of the Nomarski prism to the input of a single rotation of the jog encoder 99, from the data (i.e. a table of the amount in movement) stored in the memory 95 (step S24).

When there is an instruction from the jog encoder 99 to drive the prism, the prism is driven in accordance with the previously selected amount of drive of the prism (step S25). After that, the CPU 91 is in a waiting state (step S26).

Every time the Nomarski prism is switched together with switching of the objective, the CPU 91 selects the amount of drive of the prism as described above, and the Nomarski prism is driven by the input operation of the jog encoder 99 based on the selected amount of drive of the prism.

Figure 10:
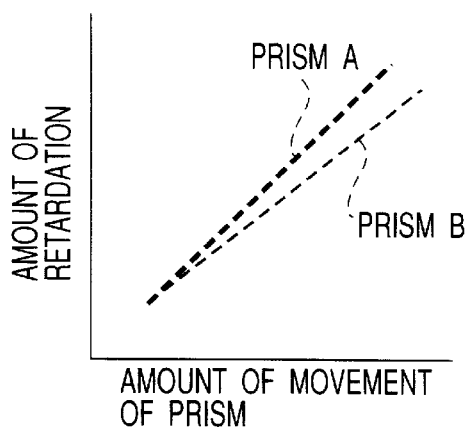
FIG. 10 is a view explaining the relationship between the amount of movement of a prism and the amount of variation in the retardation, in the first example of adjustment of the background color.
Figure 11:
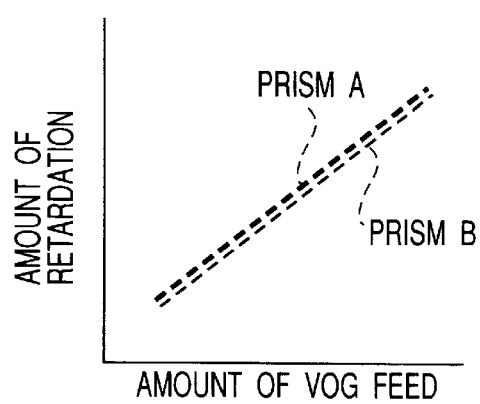
FIG. 11 is a view explaining the relationship between the amount in the jog feed and the amount of variation in the retardation, in the first example of adjustment of background color.

The relationship between the input signal of the jog encoder 99 and the amount of the drive of the Nomarski, in the stored data, teaches the amount of the drive of the prism that shows the same variation in retardation to the input of a single rotation of the jog encoder 99 when any prism is employed. Specifically, the amount of the drive of the prism that shows the same variation in retardation to the input of a single rotation of the jog encoder 99 when any prism is employed, as shown in FIG. 11, is obtained on the basis of the amount of the variation in the retardation to the preset amount of movement of each prism as shown in FIG. 10, and the amounts of the drive are set for the respective prisms and stored in the memory 95 as the tables of the amount of movement.

Figure 12:
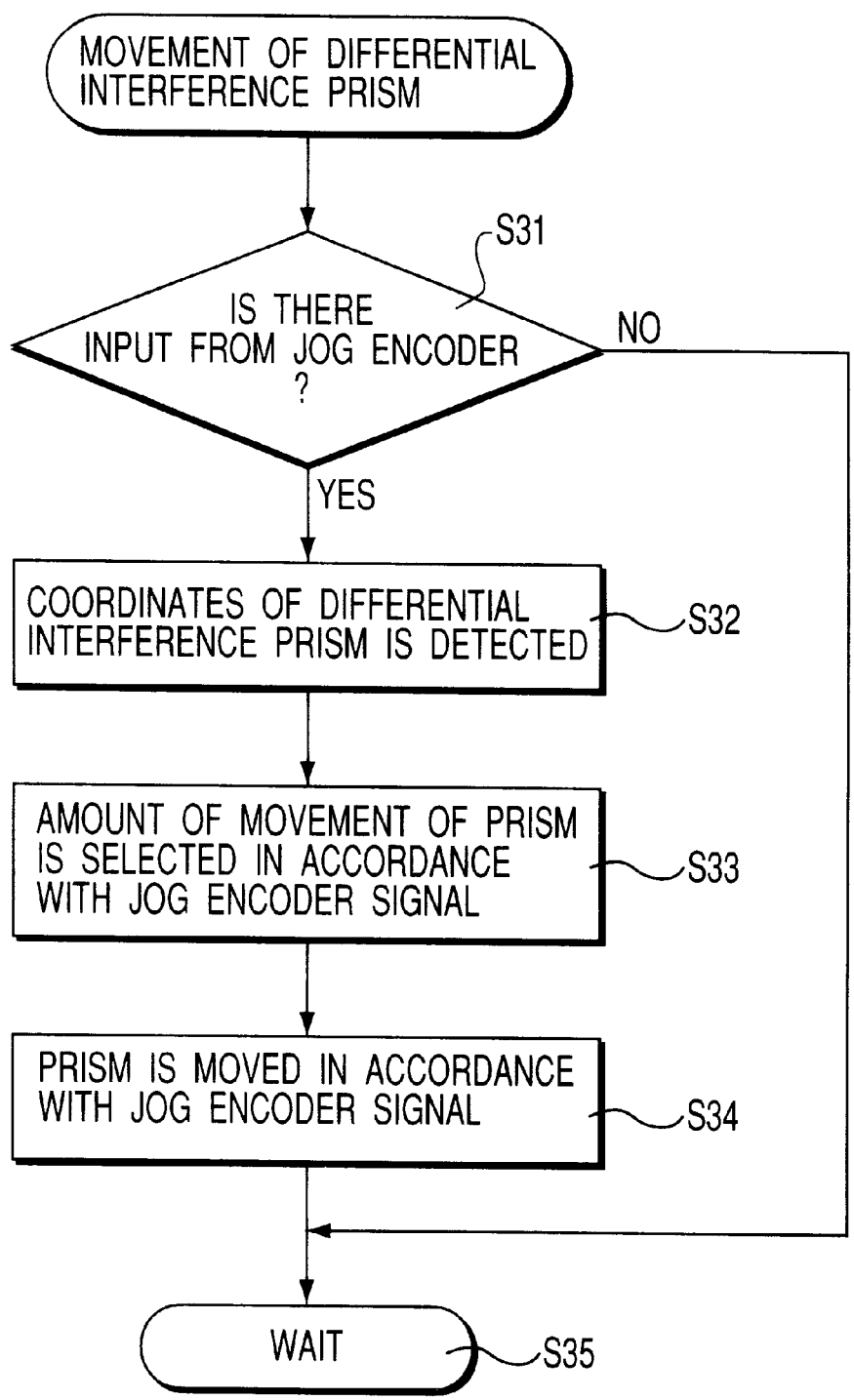
FIG. 12 is a flow chart explaining a second example of adjustment of the background color in the first embodiment.

Next, a second example of adjustment of the background color will be explained with reference to a flow chart of FIG. 12.

In the case of the second example, the amount of drive of the Nomarski prism to the input of a single rotation of the jog encoder 99 is variable in accordance with the coordinate position of the prism to the reference position and is to be set by, for example, the operations (such as sequential double clicks) of the switch 96C for instructing the Nomarski observation.

The amount of drive of the prism set to the coordinate position of the prism is stored in the memory 95 as a drive table of the prism coordinates.

Figure 13:
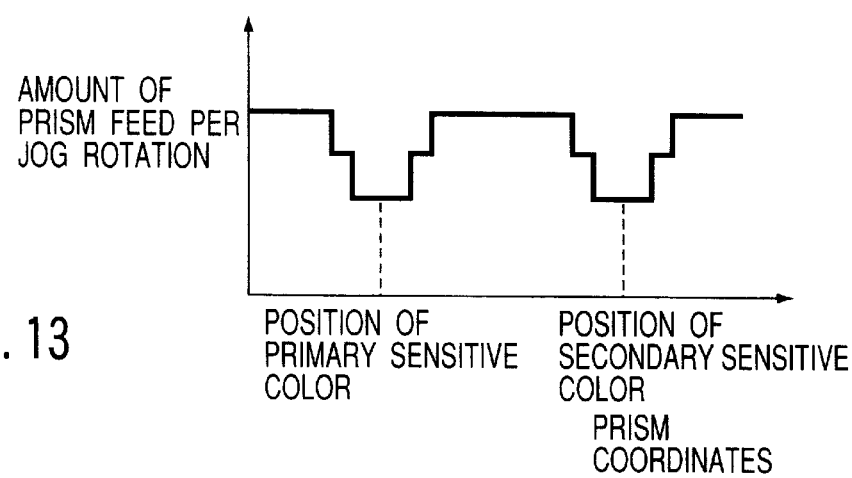
FIG. 13 a view explaining the relationship between prism coordinates and the amount of driving the prism in one rotation of a jog encoder, in the second example of adjustment of the background color, in the first embodiment.

On the drive table of the prism coordinates, for example, when the background color is observed as a sensitive color, the amount of drive of the prism for a single rotation of the jog encoder 99 at the sensitive color position where a primary sensitive color and a secondary sensitive color appear, may be set small as shown in FIG. 13.

Of course, setting for the primary sensitive color may be automatically reflected to the respective positions of the secondary sensitive color and the tertiary sensitive color or different values may be set for the respective background colors.

First, the CPU 91 discriminates whether or not there is an instruction to drive the prism from the jog encoder 99. If the instruction is input (YES), the coordinate position of the current prism to the reference position is detected (step S32). The detection of the coordinate position of the current prism is executed at any time by counting the number of pulses of the linear stepping motor 62 from the reference position sensor 88 by a counter provided in the CPU 91.

Then, the amount of drive of the Nomarski prism to the input of a single rotation of the jog encoder 99 is selected from the drive table of the prism coordinates stored in the memory 95, in accordance with the detected coordinate position of the prism (step S33).

Next, the Nomarski prism is driven by the input operation of the jog encoder 99, in accordance with the selected amount of drive of the prism (step S34).

The operations are in a waiting state (step S35), and every time the instruction to drive the prism is output by the input operation of the jog encoder 99, the CPU 91 selects the amount of drive of the prism from the coordinate position of the prism and thereby the prism is driven on the basis of the selected value.

Figure 14:
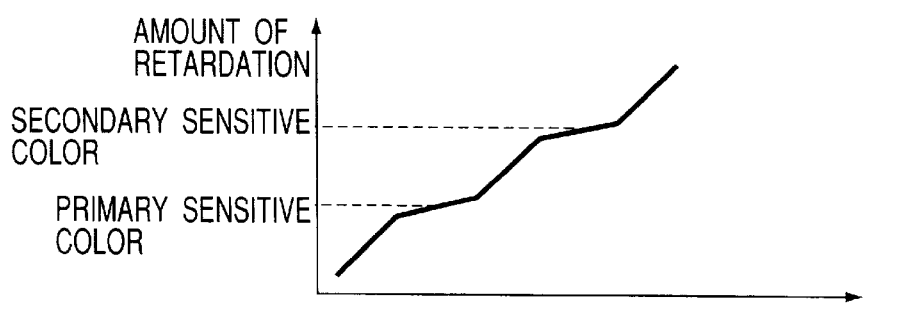
FIG. 14 is a view explaining the relationship between the amount of jog rotation and the amount of retardation, in the second example of adjustment of the background color, in the first embodiment.

As described above, if the amount of drive of the prism at the sensitive color position is set to be small, the amount of movement of the prism can be made smaller than the amount of rotation of the same jog encoder, at the sensitive color position, as shown in FIG. 14, and thereby the background color can be adjusted more finely.

As described above, the second example has an advantage that very good operability can be obtained since the sensitivity in the drive of the prism can be variably set at the position which needs observation and the position which does not need observation.

The method of adjusting the background color by the operation of the jog encoder is not limited to the structure having a plurality of Nomarski prisms as seen in the present embodiment and, needless to say, can be applied to an optical element switching device in which only one prism is inserted into or removed from the optical path 9.

As described above, in the first embodiment, three kinds of Nomarski prisms are loaded on the turret and held to be capable of direct-acting in the horizontal direction. When any one of the Nomarski prisms is arranged in the single optical path 9, the Nomarski prism is driven in a certain direction by the linear stepping motor. Therefore, the maximum optical performance can be achieved, the contrast can be adjusted exactly, and motor-driven switching of the Nomarski prism and the mechanism of contrast adjustment can be realized while limiting the number of the actuators at minimum, in a simple structure.

In addition, since the linear stepping motor is arranged at the stationary portion of the optical element switching device, there is no convenience that the actuator for adjusting the contrast may be rotated on the turret of the Nomarski prisms and may be entwined with the cables.

In the first embodiment, the Nomarski prism is switched after the operation of switching the objective has been completed. However, in a system of directly designating any one of objectives to be switched with, since the kind of the objective to be switched with is confirmed, the Nomarski prism may be switched in parallel to the operation of switching the objective. In this case, the time to be spent for all the operations can be reduced very remarkably.

Figure 15:
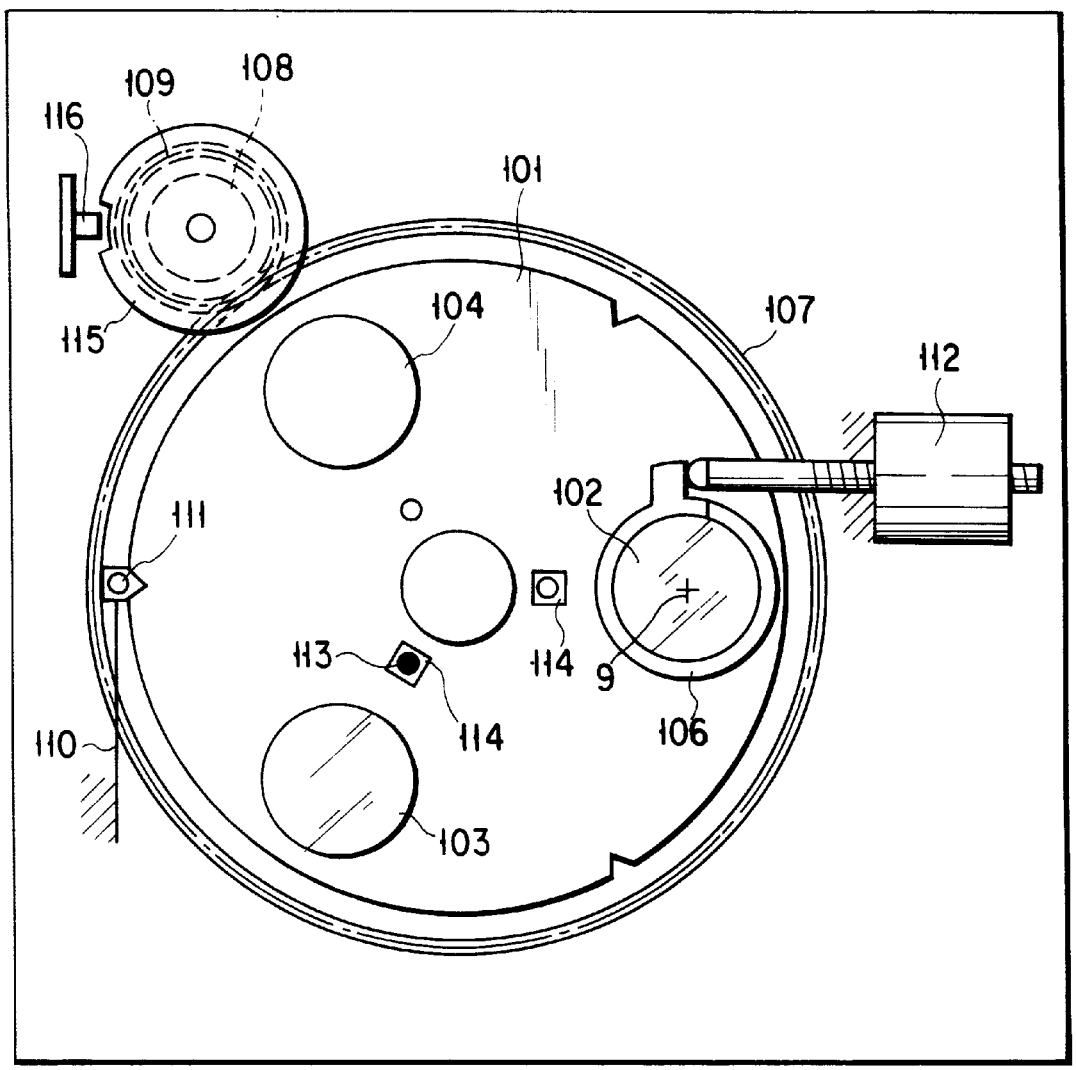
FIG. 15 is a view showing an example of modification of the optical element switching device according to the first embodiment.

FIG. 15 shows a modified example of the optical element switching device according to the first embodiment.

This optical element switching device is constituted by a turret 101, a click spring 110 for positioning the turret 101, a motor 108 attached to a stationary portion (not shown) of the microscope main body, a pinion gear 109, a linear stepping motor 112, a disc 115 having a cutaway portion to be attached to the shaft of the motor 108, and a photo-interrupter 116 for sensing the cutaway portion.

Two optical elements, for example, an analyzer 102 and a ¼-wavelength plate 103 rotated in the optical axis, and one hole 104, are attached to the turret 101, and V-shaped engagement grooves are formed at three portions of the outer periphery of the turret 101.

In a case where the analyzer 102 is employed for an optical microscope, the analyzer 102 is inserted into the optical path 9 when the microscopic inquiry of differential interference or the microscopic inquiry of polarization is executed. The ¼-wavelength plate is often used for the purpose of cutting hazardous flare light reflected on a lens surface or the like provided in the middle of the optical path 9, when the confocal microscopic inquiry and the like are executed. Therefore, the optical element switching device described in the present modified example is also employed together with the switching of the microscopic inquiry.

The click spring 110 fits the click ball 111 attached to its top end into the engagement grooves and holds the click ball 111, and any one of the analyzer 102, the ¼-wavelength plate 103 and the hole 104 on the turret 101 is positioned in the optical path 9. The pinion gear 109 is fixed at the shaft of the motor 108 and engaged with a gear 107 attached to the outer periphery of the turret 101. The linear stepping motor 112 has an axial top end portion which can advance or retreat to contact and push a projecting portion of a frame member 106 fixed with the analyzer 102 and supported rotatably on the turret 101.

A magnet 113 for indication for sensing the type of the optical element is also attached to the turret 101. In accordance with this, two hole sensors 114 are provided at stationary portions (not shown) of the microscope main body. A method of recognizing the optical element by the magnet 113 and the hole sensors 114 has been explained and its explanation is omitted here.

The analyzer 102 is fixed at the frame member 106 supported rotatably to the turret 101. That is, since the projecting portion of the frame member 106 pushes the axial top end portion of the linear stepping motor 112 by a spring (not shown), the analyzer 102 is rotated in the optical axis by the advance or retreat of the axial top end portion thereof.

With the rotation of the motor 108, the rotation is transmitted to the gear 107 engaged with the pinion gear 109 and the turret 101 is thereby rotated. At this time, the click ball 111 is fitted and positioned in the engagement grooves formed at the outer periphery of the turret 101 by the spring force from the top end of the click spring 110.

Similarly, with the rotation of the motor 108, the disc 115 having the cutaway portion is rotated and the photo-interrupter 116 senses the cutaway portion. When the cutaway portion is sensed, the V-shaped grooves at the outer periphery of the turret 101 are always arranged to engage with the click ball 111.

The operations of this modified example will be explained.

Figure 16:
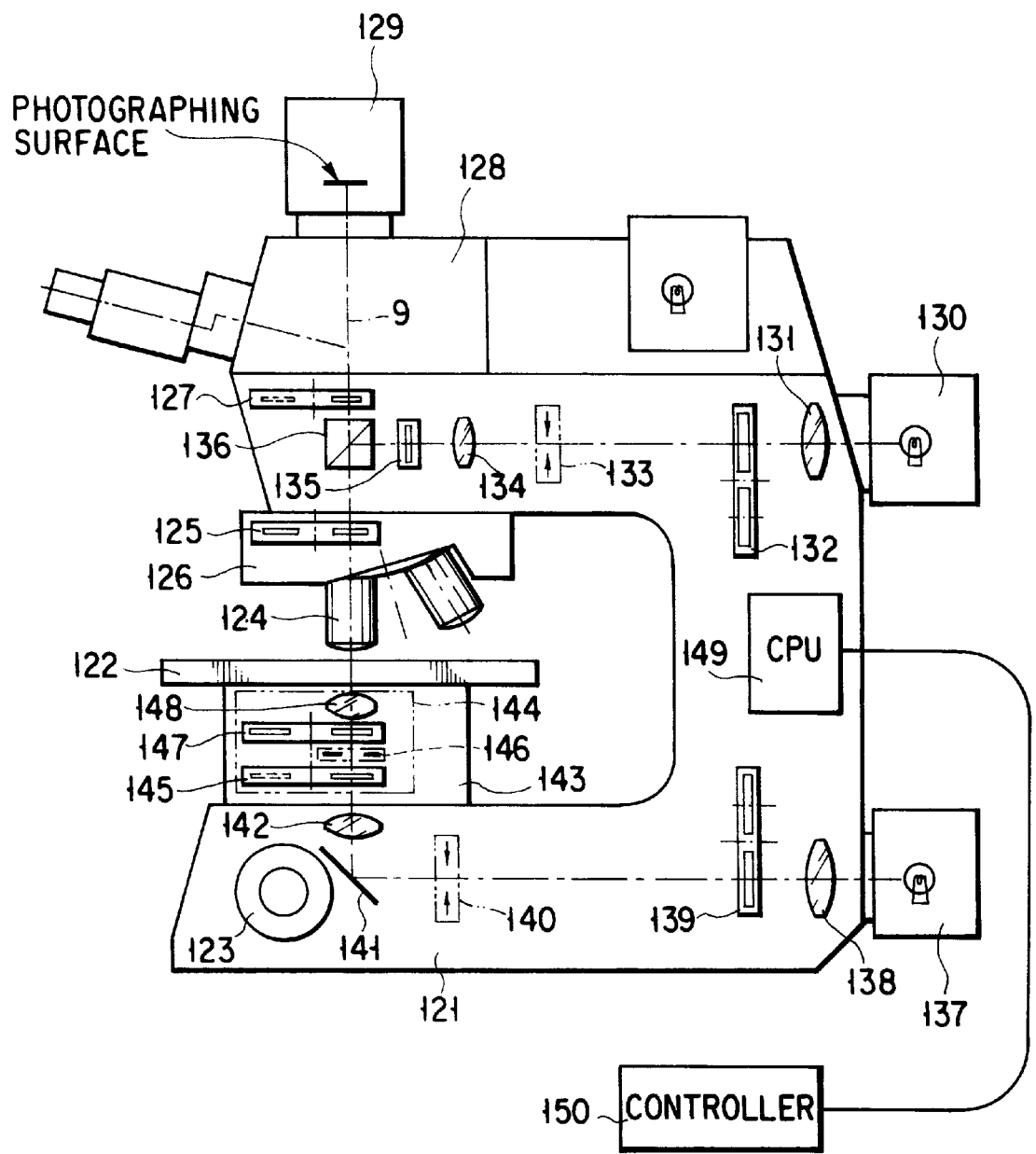
FIG. 16 is a view showing a schematic structure of an optical microscope loaded with the optical element switching device according to a second embodiment of the present invention.

First, when an instruction to switch the microscopic inquiry is output by means of controller switches that send instructions for operations of the parts of the microscope as shown in FIG. 16, the turret 101 is rotated by the motor 108 in accordance with the designated microscopic inquiry. At this time, the shaft of the linear stepping motor 112 retreats to the limit position.

After it has been detected by the output of the hole sensor 114 that the instructed optical element has reached in the optical path 9, the photo-interrupter 116 senses the cutaway portion of the disc 115, the turret 101 is stopped and positioned by the click ball 111.

If the optical element in the optical path 9 is the analyzer 102, the shaft of the linear stepping motor 112 advances to the reference position and contacts the projecting portion of the frame member 106. After that, the linear stepping motor 112 pushes the projecting portion of the frame member 106 and the analyzer 102 is thereby stopped at a predetermined angle. The cross nicol to a polarizer (not shown) which is required when the microscopic inquiry of differential interference or the microscopic inquiry of polarization is executed, may be adjusted by driving the linear stepping motor 112 by the switches of the controller.

As described above, in the modified example of the first embodiment, the optical element is supported rotatably on the turret, and is rotated by the actuator provided at the stationary portion of the microscope when the optical element is arranged in the optical path 9. Therefore, the optical element switching device for switching and adjusting the optical element whose observing state is varied by the rotation can be realized with a simple structure.

Next, a second embodiment of the present invention will be described.

FIG. 16 shows a schematic structure of an optical microscope loaded with an optical element switching device according to a second embodiment of the present invention. In the present embodiment, the above-mentioned optical element switching device is loaded in the microscope.

In a microscope main body 121, the observation system is constituted by a stage 122 on which a specimen is placed, a focus handle 123 for vertically driving the stage 122 for focusing, an objective switching device 126 in which objectives 124 are mounted and an optical element switching device (hereinafter called a DIC turret) 125 such as a DIC prism is incorporated, and which is arranged over the stage 122, an optical element switching device (hereinafter called an AN turret) 127 such as an analyzer arranged over a vertical optical path 9 of the objectives 124, a lens barrel portion 128 having an optical path 9 for confocal observation and a light source therefor, and a TV camera 129 attached to a straight barrel portion of the lens barrel portion 128.

The reflected illumination system is constituted by a reflection light source 130 of halogen or the like provided at the upper back surface portion of the microscope main body 121, a collector lens 131 for collecting light emitted from the reflection light source 130, an ND filter turret 132 for adjusting the quantity of the light from the reflected light source 130, an aperture stop 133 for adjusting a numerical aperture of the reflected illumination light, a projection lens 134 for projecting an image of the aperture stop 133 onto a pupil of the objectives 124, a polarizer inserting/removing unit 135 for inserting into or removing from the optical path 9 a polarizer for polarizing the reflected illumination light in a constant vibrating direction, and a mirror unit (cube) 136 for switching the reflected illumination light to the light field illumination or the dark field illumination, in the vertical optical path 9 of the objectives 124.

The transmitted illumination system is constituted by a transmitted light source 137 of halogen or the like provided at a lower back surface portion of the microscope main body 121, a collector lens 138 for collecting light emitted from the transmitted light source 137, an ND filter turret 139 for adjusting the quantity of the light from the transmitted light source 137, a field stop 140 for limiting a range of the transmitted illumination, a mirror 141 for reflecting the transmitted illumination light upwardly and vertically, a projection lens 142 for projecting an image of the field stop 140 onto a specimen to be observed, and a condenser unit 144 provided in a stage receiver 143 for supporting the stage 122.

The condenser unit 144 includes a polarizer inserting/removing unit 145 similar to that of the reflected illumination system, an aperture stop 146 for adjusting the numerical aperture of the transmitted illumination light, an optical element turret 147 for inserting/removing an optical element such as an IC prism or the like, and a condenser lens 148 for collecting the transmitted illumination light on a specimen to be observed and projecting an image of the aperture stop 146 onto a pupil of the objective 124.

Further, the optical microscope has a control unit (CPU) 149 connected to the respective switching parts of the microscope main body to control their operations, and a controller 150 connected to the CPU 149 to displaying operation instructions and states of the respective switching parts.

Switching mechanisms using general motors can be applied to the mirror unit (cube) switching mechanism, the polarizer inserting/removing mechanism, the focusing mechanism, and the ND filter switching mechanism.

Next, operations of the second embodiment will be described.

FIG. 17 shows the inserted/removed states of the optical elements of the respective switching parts into/from the optical path 9.

When the observation is executed by employing the reflected illumination, for example, when the operator inputs an instruction for the microscopic inquiry of the reflected light field by means of the controller 150, the CPU 149 instructs the respective switching parts to insert the holes of the light field cube, the ND filter 132 for reflection, and AN turret 127 into the optical path 9, with the mirror unit 136 serving as an optical element to be inserted into the optical path 9.

In the other microscopic inquiry, for example, the microscopic inquiry of the reflected differential interference, the control unit makes an instruction to select the optical elements such as the DIC prism in the DIC turret 125, the light field cube of the mirror unit 136, the polarizer 132 for reflection and the analyzer of the AN turret 127, and to insert them into the optical path 9.

Similarly, when the observation is executed by the transmitted illumination, for example, when the operator inputs an instruction for the microscopic inquiry of the transmitted differential interference by means of the controller 150, the CPU 149 makes an instruction to select the optical elements such as the DIC prism in the DIC turret 125, the light field cube of the mirror unit 136, the analyzer of the AN turret 127, the DIC prism of the optical element turret 147, and the polarizer of the transmission polarizer inserting/removing unit 145, and to insert them into the optical path 9.

Further, in the other microscopic inquiry, for example, in the microscopic inquiry of the transmitted phase difference, the control unit similarly makes an instruction to select the light field cube of the mirror unit 136, the hole of the AN turret 127 and a ring slit opening of the optical element turret 147, and to insert them into the optical path 9.

In FIG. 17, however, in a case of the reflection confocal microscopic inquiry, the optical path 9 inside the lens barrel portion 128 needs to be switched to a confocal revolutionary optical path 9, together with the insertion of the optical elements shown in the figure.

In the case of the microscopic inquiry of the transmitted phase difference, an objective exclusive for the microscopic inquiry of the phase contract which arranges a phase plate at a position of the pupil of the objective 124 needs to be selected, together with the insertion of the optical elements shown in the figure.

Moreover, the same advantage as that of the first embodiment and its modified example can be obtained from the optical element switching device (DIC turret) 125 and optical element switching device (AN turret) 127, in the present embodiment.

This advantage can be achieved not only in the observation of the reflected illumination, but also in the observation of the transmitted illumination, as shown in FIGS. 16 and 17. This advantage is significant with respect to the point that from the viewpoint of the structure of the optical microscope, the objective switching device 126 including the optical element switching device (DIC turret) can be used commonly to both the cases employing the reflected illumination and the transmitted illumination.

Figure 18:
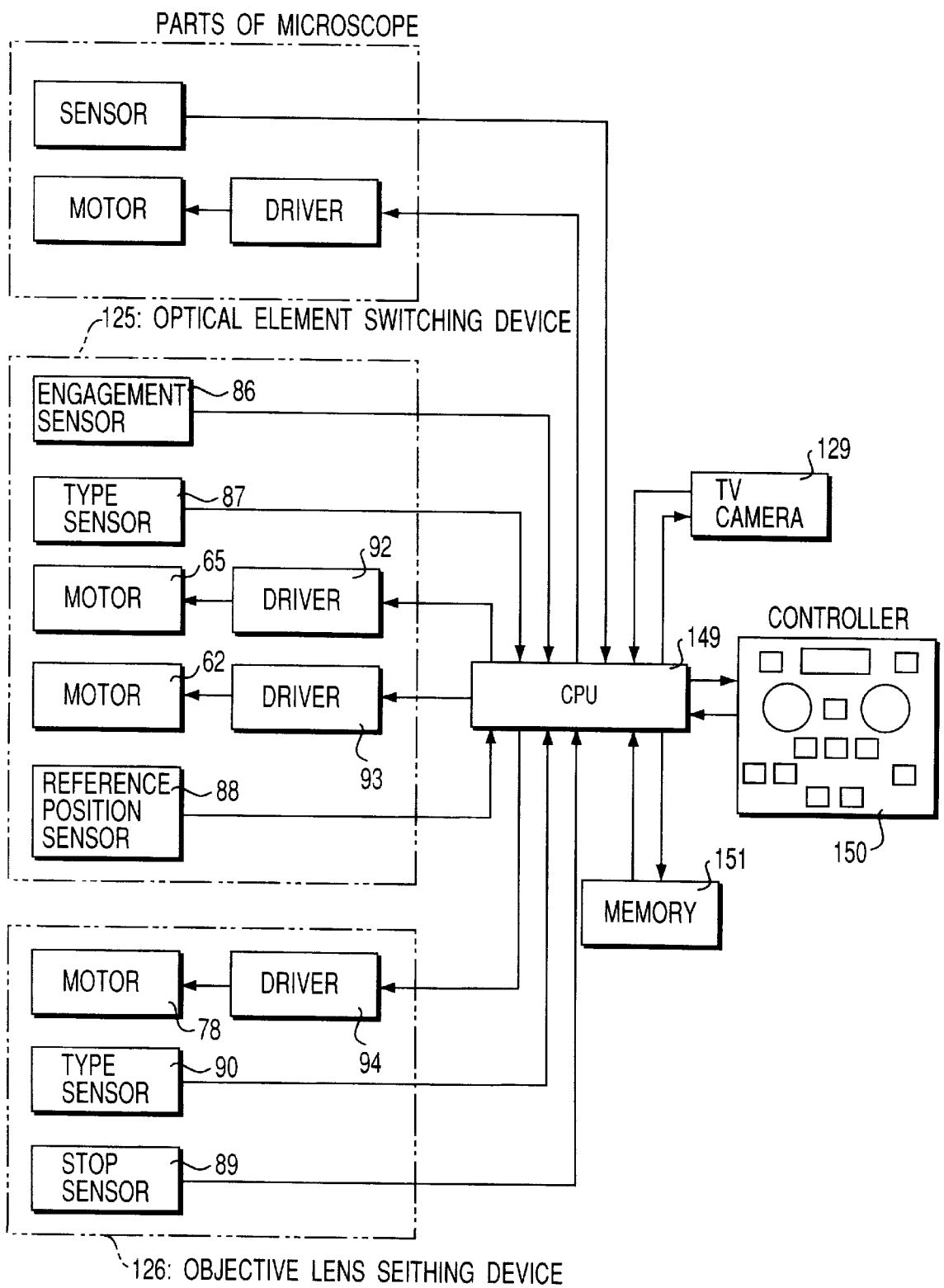
FIG. 18 is a view showing an example of the circuit configuration of the optical microscope loaded with the optical element switching device according to a third embodiment of the present invention.

Next, FIG. 18 shows an example of a circuit configuration of the optical microscope loaded with the optical element switching device according to a third embodiment of the present invention.

The structure of the optical microscope according to the third embodiment is the same as that of the above-explained second embodiment, but partially different with respect to the circuit configuration and the advantage. Particularly, the optical microscope has a characteristic in the operation of switching the Nomarski prisms.

In the circuit configuration of the present embodiment, a TV camera 129 in which a photographing element such as a CCD and its control unit are built, is connected to the CPU 149, in addition to the same configuration as that explained in FIG. 6. Further, a memory 151 for storing the image data photographed by the TV camera 129 and the data concerning the amount of drive of the Nomarski prisms, is also connected to the CPU 149.

In addition, the drivers, motors and sensors for driving the parts of the microscope shown in FIG. 16 are also connected. The figure shows only one driving unit, but a plurality of driving units are actually connected to the respective parts of the microscope.

Figure 19:
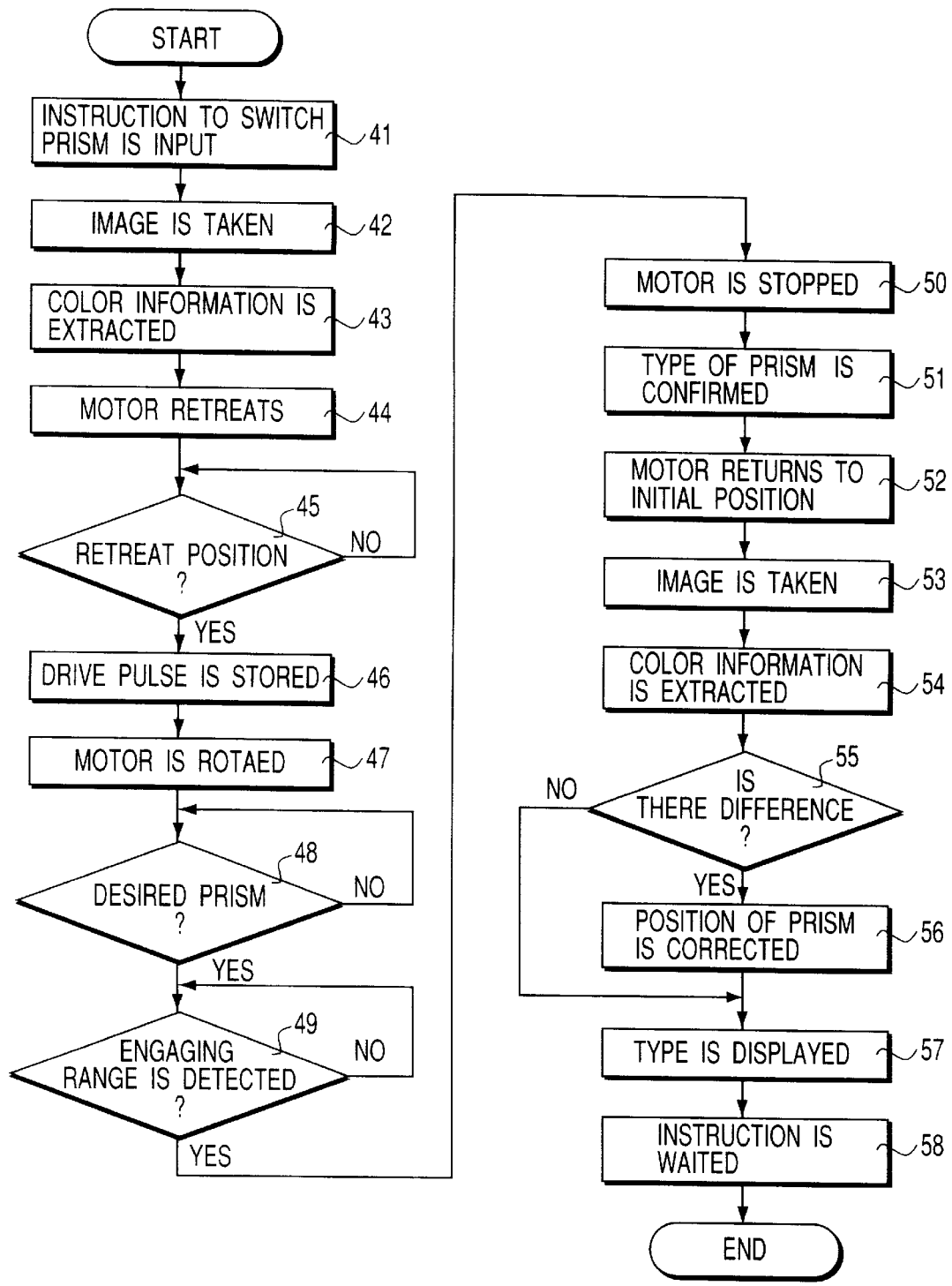
FIG. 19 is a flow chart explaining the operations of the third embodiment.

The operations of the present embodiment will be described with reference to a flow chart of FIG. 19.

First, when an instruction to switch the Nomarski prism is input by means of the controller (step S41), a current image of the differential interference observation is taken from the TV camera 129 (step S42). The control unit in the controller analyzes the image and extracts the color information, and the information is stored in the memory inside the control unit (step S43).

Then, the linear stepping motor 62 for driving the Nomarski prism is made to retreat to the limit position (step S44), and it is judged whether or not the linear stepping motor 62 has retreated to the limit position (step S45). If it is detected that the linear stepping motor 62 has retreated to the limit position (YES), the number of the pulse of the linear stepping motor 62 required to drive the linear stepping motor 62 to the limit position is stored in the control unit (step S46).

Figure 8:
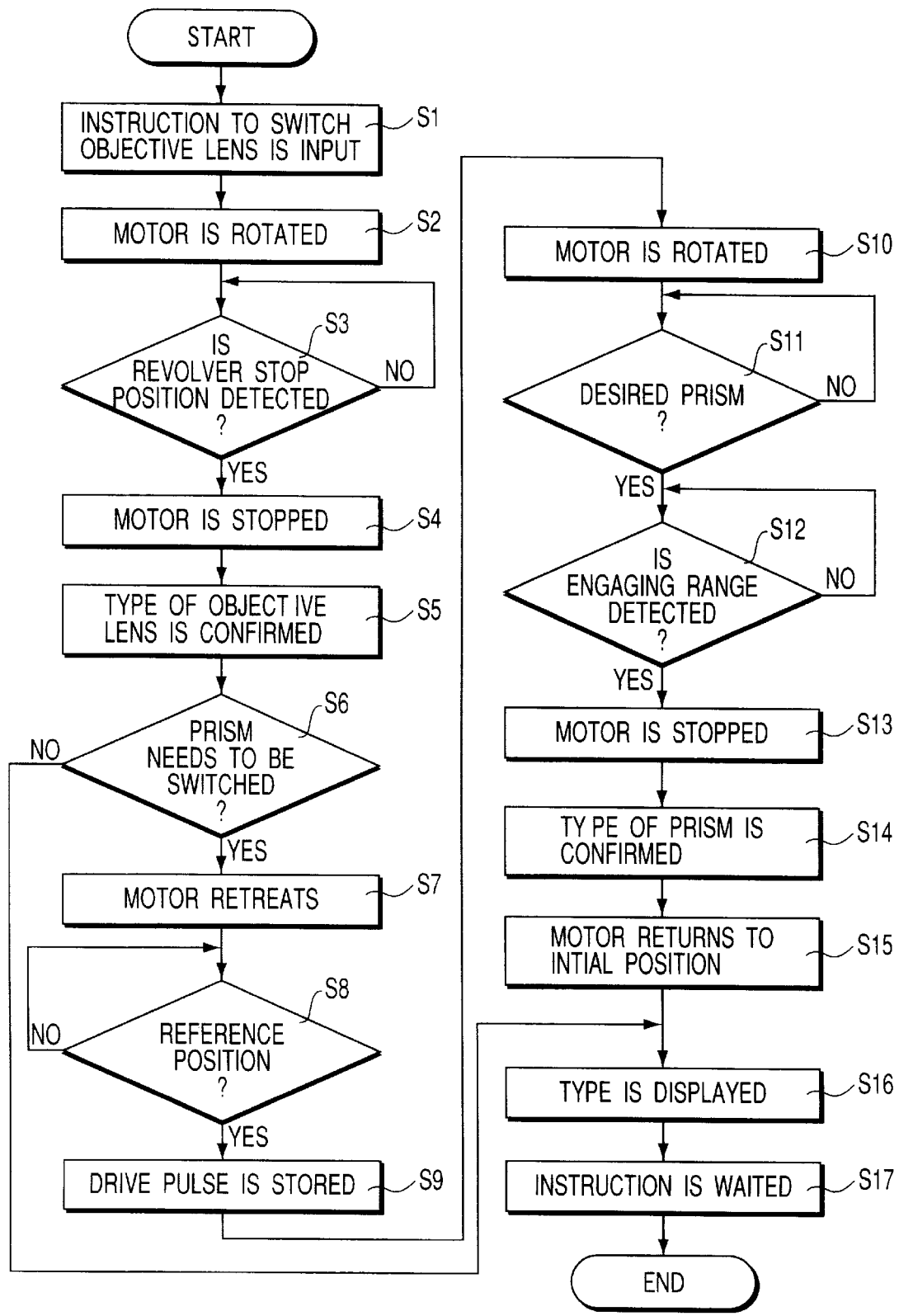
FIG. 8 is a flow chart explaining the operations of the first embodiment.

After that, in steps S46 to S50, the turret 54 is rotated as done in steps S9 to S13 of FIG. 8 explaining the first embodiment, the desired Nomarski prism is arranged in the optical path 9 and the turret 54 is stopped.

Next, after the type of the Nomarski prism has been confirmed again (step S51), the linear stepping motor 62 is made to return temporarily to the initial position in accordance with the number of the pulse stored in the control unit (step S52).

An image obtained after switching the Nomarski prisms is taken from the TV camera 129 (step S53), and the control unit extracts the color information from the image (step S54). It is judged here whether or not the current color information is different from the color information of the image from the previous Nomarski prism (step S55). If there is a difference between both the color information (YES), the Nomarski prisms are driven by the linear stepping motor 62 until the color information coincides with one another (step S56). Finally, the type of the Nomarski prism driven after completion of the switching operation is displayed on the display unit of the controller (step S57) and the optical element switching device waits until a next instruction is input (step S58).

Next, a modified example of the third embodiment will be explained.

The structure of the present example is the same as that of the third embodiment, but is different with respect to the function only.

Figure 20:
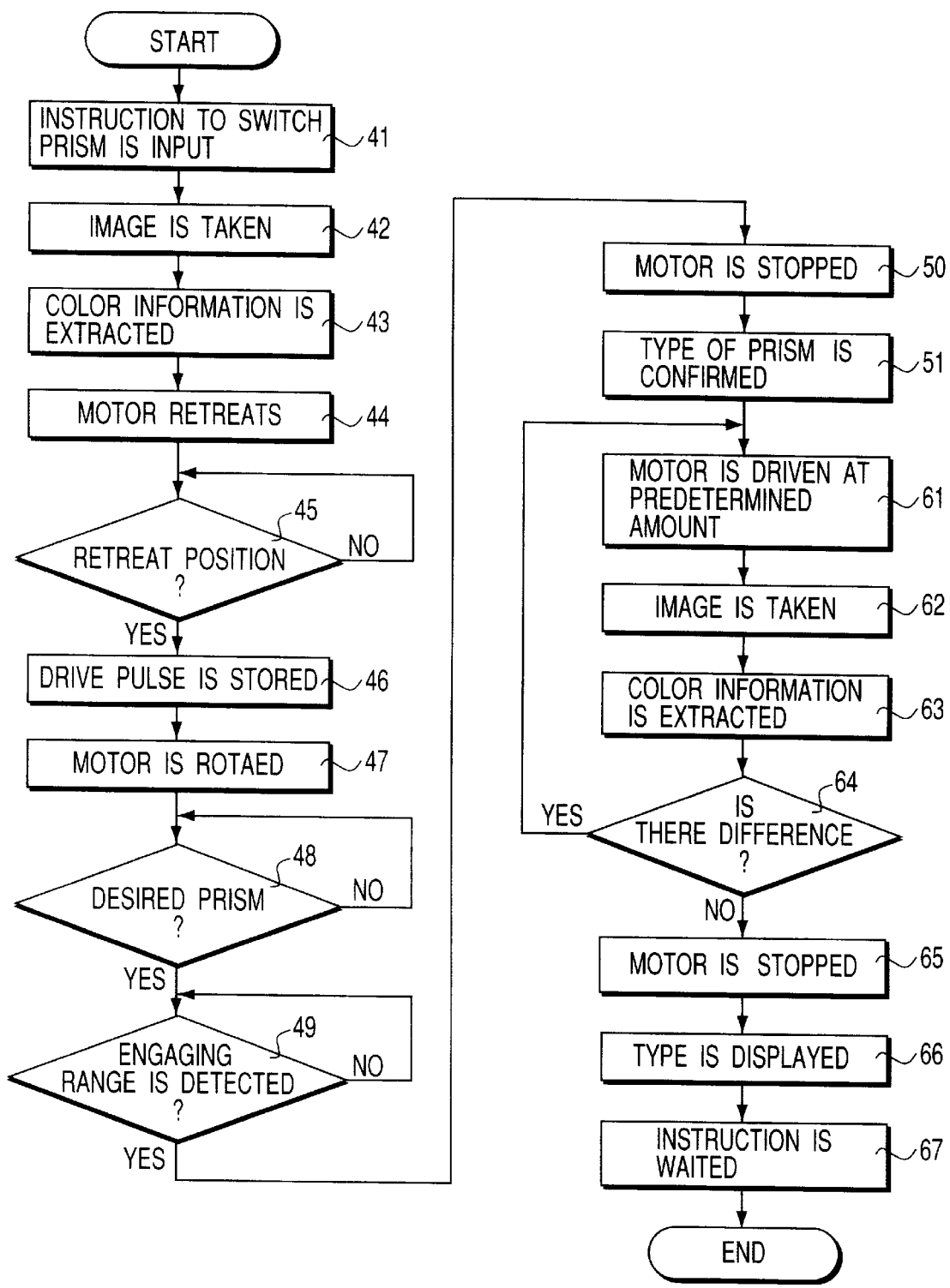
FIG. 20 is a flow chart explaining a modified example of the optical element switching device according to the third embodiment.

FIG. 20 is a flow chart showing the function of the present example.

In FIG. 20, the operations in steps S41 to S51 are the same as those of the third embodiment (FIG. 19), and their explanations are omitted here.

As for the color information in step S43, however, for example, the input image data is subjected to three different filtering processes, and the intensity data items of three 400 nm, 550 nm and 700 nm are multiplied by predetermined coefficients and then normalized, respectively.

Figure 21:
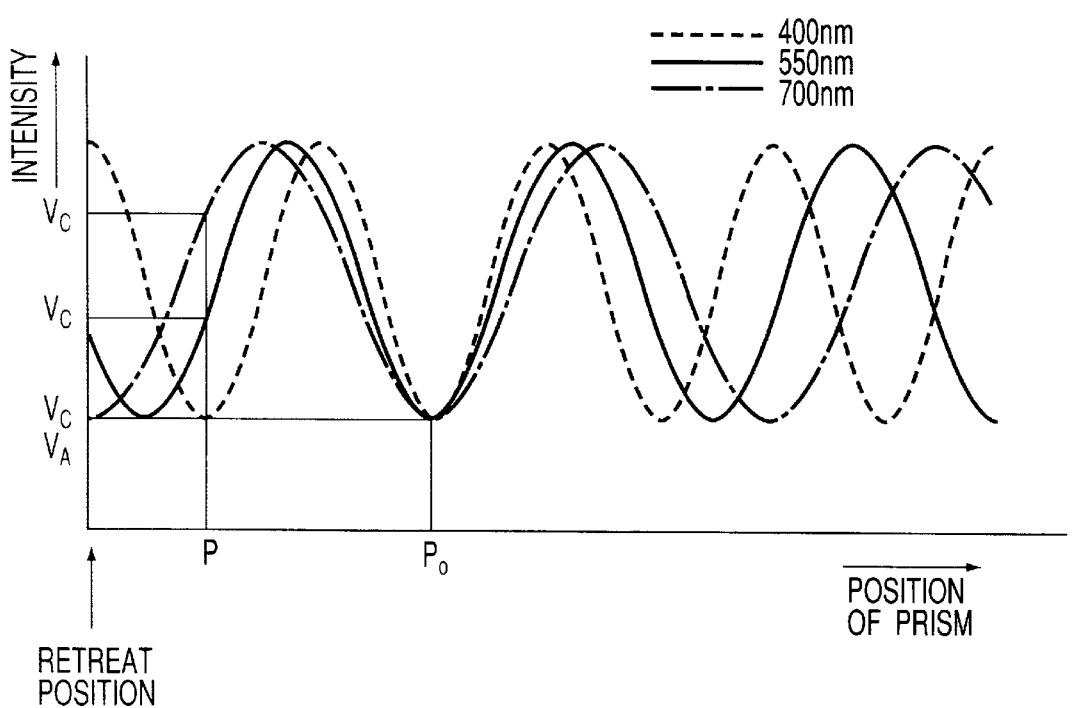
FIG. 21 is a graph explaining showing the relationship between a position of the prism and the data of intensity in respective wavelengths when a Nomarski prism is driven.

FIG. 21 shows variation of the color information extracted when the Nomarski prisms are driven in a case where a mirror-like flat specimen is observed.

In FIG. 21, a dark position in the Nomarski observation is a point Po at which the intensities of the three wavelengths are small and almost coincide with one another. When the Nomarski prisms are driven from the dark position, the three wavelengths repeat large and small variations in different cycles, respectively. There is no dark position at any points other than the point Po, and a position at which the color information based on the three wavelengths represents a minimum value Vo is always the point Po.

Further, a prism point at which color information values based on the three wavelengths are VA, VB and VC is a point P. That is, the color information thus extracted on the basis of the intensities of the three wavelengths has the values corresponding to the points of the Nomarski prisms.

Next, after the linear stepping motor 62 has been driven at a predetermined amount toward its initial position in accordance with the number of the pulse stored in the memory 151 (step S61), the CPU 149 takes the image from the TV camera 129 (step S62), extracts the color information of the above-explained three wavelengths (step S63) and compares them with the previous color information stored in the memory 151 (step S64).

If there is a difference to the previous color information, the color information is temporarily compared while driving the motor at a predetermined amount by repeating steps S61 to S64.

When the CPU 149 judges that the color information extracted at step S64 is the same as the previous color information, the Nomarski prisms are stopped by an instruction from the CPU 149 (step S65).

Finally, similarly to the third embodiment, the type of the Nomarski prism driven after completion of the switching operation is displayed on the display unit of the controller 150 (step S66) and the device waits until a next instruction is input (step S67). However, the graph of the color information shown in FIG. 21 does not always illustrate such good regularity in accordance with specimens to be observed and, therefore, complete coincidence of the values is not required, but a predetermined permissible error is set when the color information is compared at step S64.

The present modified example is very effective when a mirror-like flat specimen, for example, a polished surface of a hard disc or a wafer is subjected to the Nomarski observation.

Since the intensity data of the three wavelengths is used as the color information. Even if the type of the prisms is changed, the position of the prism can be automatically corrected so as to execute observation at the same color (contrast), by comparing the color information taken from the TV camera with the color information at the prism before switched.

In addition, by limiting the range of the image from which the color information is extracted, approximately under 5% of the field of view of the photographing element such as a CCD or the like, the time to be spent for the process of the CPU 149 can be reduced and the present modified example is very effective for a specimen other than that mentioned above (for example, a specimen having a remarkable pattern variation in the field of view).

As described above, every time the Nomarski prisms are switched, the color information of the image is extracted and the positions of the Nomarski prisms are corrected, in the third embodiment and its modified example. However, the reference position of each of the Nomarski prisms may be stored by the initial switching operation and the deviation of each of the Nomarski prisms may be corrected every time the Nomarski prisms are further switched. In this case, since the images do not need to be taken every time the Nomarski prisms are switched, the overall operation time can be reduced remarkably.

Therefore, according to the optical microscope of the above-described embodiment, since the reference positions of the respective optical elements are determined in accordance with the color information of the microscopic images obtained when the respective optical elements are arranged in the optical path and since the positions of the optical elements are corrected on the basis of the reference positions when the turret is turned to switch the optical elements, the observation state is automatically adjusted to be always the same regardless of the type of the optical elements. When the Nomarski prisms are used as the optical elements, even if different Nomarski prisms are arranged in the optical path in accordance with the switching of the objectives, the positions of the Nomarski prisms are automatically corrected to obtain the same retardation in accordance with the color information of the images.

Further, according to the optical element switching device of the present embodiment, a plurality of optical elements are held so as to be horizontally direct-acting or rotatable on the turret. Therefore, when the Nomarski prisms are used as the optical elements, the Nomarski prisms can be constituted to always move straight in a constant direction in the optical path, the optical performance can be achieved at maximum extent, and the contrast can be adjusted exactly.

In addition, when the turret is rotated and positioned at a predetermined rotary position and when any one of plural optical elements is arranged in the optical path, this optical element is moved by one single fixed drive unit. Therefore, a plurality of drive units (actuators) do need to be prepared for the respective optical elements and only one actuator can be used instead.

Further, since the control unit interlocks the objective switching device with the optical element switching device, power can be saved without manually switching or adjusting the optical elements together with the switching of the objectives.

In each of the above-described embodiments, the optical elements are arranged planarly on one turret and one of them is selected to be positioned in the optical path. However, the present invention is not limited to this.

Figure 22:
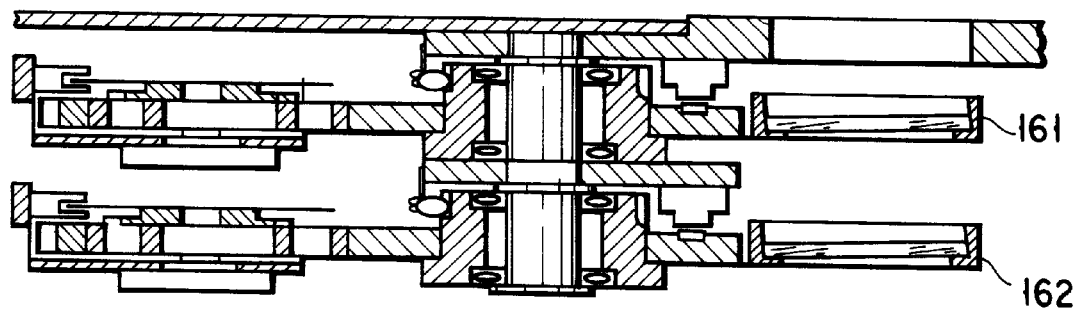
FIG. 22 is a view showing an example of constitution of stacked turrets.
Figure 23:
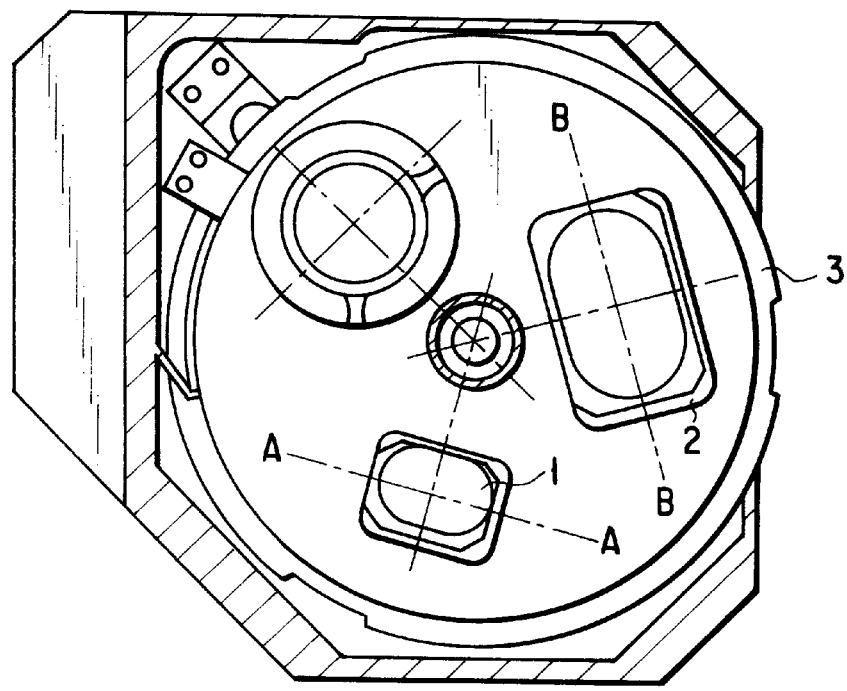
FIG. 23 is a view explaining a switching mechanism in a conventional microscope.
Figure 24:
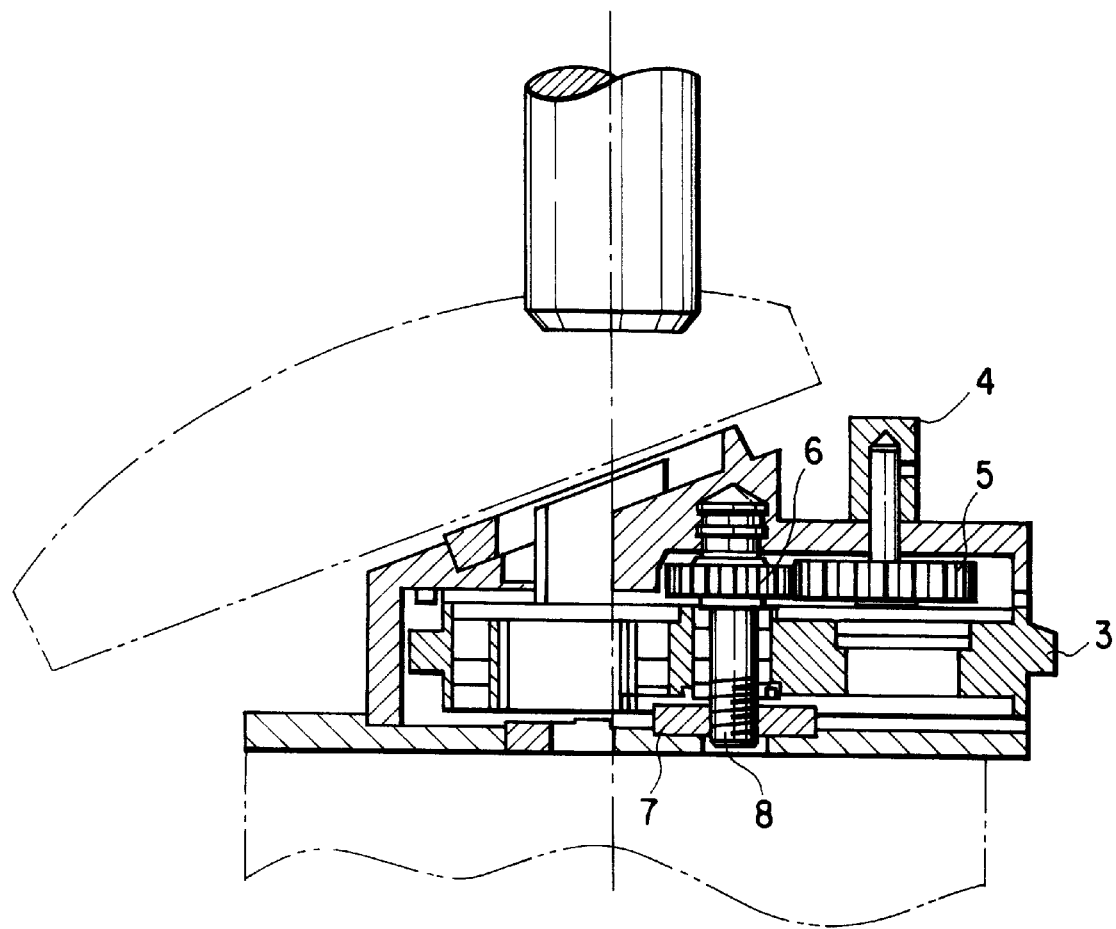
FIG. 24 is a sectional view showing the conventional a switching mechanism shown in FIG. 23.

As shown in FIG. 22, when the microscopic inquiry is employed in a state where a plurality of optical elements are stacked, two or more of turrets, for example, turrets 161 and 162 may be stacked and the operations such as the rotation, movement and the like may be executed by the above-described driving mechanisms.

In each of the embodiment, a plurality of optical elements are switched by the turret, but one optical element and one hole may be switched.

In addition, one or both of the driving mechanism for switching the turret and the driving mechanism for driving the optical elements on the turret may be modified to be operated manually.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope loaded with an optical element switching device for switching optical elements for execution of a plurality of microscopic inquiries and an objective switching device for switching objectives, said microscope comprising:

a revolver mounted at a base portion of a main body of said optical element switching device so as to be rotatable around an axis inclined to an optical axis of said microscope, and loaded with said plurality of objectives;

a revolver driving mechanism for driving said revolver to rotate by voltage application and arranging a selected one of said objectives along the optical axis of said microscope;

an optical element turret, mounted at the base portion of the main body of said optical element switching device at an opposite side to said revolver with respect to the optical axis of said microscope, and loaded with a plurality of optical elements, for rotating orthogonally to the optical axis of said microscope;

an optical element turret driving mechanism for driving said optical element turret to rotate by voltage application and for stopping a selected one of said optical elements along the optical axis of said microscope;

a plurality of guide mechanisms, mounted on said optical element turret, for guiding said plurality of optical elements respectively so that each of said plurality of optical elements can be moved linearly;

a plurality of springs for applying an urging force to said plurality of optical elements respectively in a direction of linear movement of said optical elements guided by said guide mechanisms;

an optical element moving mechanism mounted at the base portion of the main body of said optical element switching device, said optical element moving mechanism comprising a shaft for pushing said selected optical element stopped along the optical axis of said microscope, against the urging force of a respective one of said plurality of springs, in a direction of the linear movement of said selected optical element guided by a respective one of said guide mechanisms and also comprising a motor for extending said shaft; and a control unit for controlling rotations of said revolver driving mechanism and said optical element turret driving mechanism, and extension of said shaft executed by said optical element moving mechanism.

2. A microscope according to claim 1, further comprising:

an operation unit for operating said optical element moving mechanism; and an input unit for setting a ratio of conversion of an amount of operation in said operation unit to an amount of extension and movement of said shaft;

wherein the amount of movement of said optical element per unit amount of operation of said operation unit is variable by arying a setting level of said input unit.

3. A microscope according to claim 1, further comprising:

an operation unit for operating said optical element moving mechanism; and a setting unit for automatically setting a ratio of conversion of an amount of operation in said operation unit to an amount of extension and movement of said shaft, in accordance with a kind of the optical element arranged along said optical axis;

wherein the amount of movement of said optical element per unit amount of operation of said operation unit is automatically set in accordance with kinds of the optical elements.

4. A microscope according to claim 1, wherein said plurality of optical elements are Nomarski prisms, and said control unit controls said optical element turret driving mechanism so as to automatically select one of the Nomarski prisms to be used in accordance with a kind of said objective arranged along said optical axis and stop the selected Nomarski prism along said optical axis.

5. A microscope according to claim 4, further comprising:

a camera for photoelectrically acquiring images of a specimen to be observed; and a memory unit for storing chromatic information of the images acquired by said camera;

wherein said control unit stores chromatic information of an image acquired by said camera before switching of said optical elements, compares said chromatic information with chromatic information of an image acquired by said camera after switching of said optical elements, and drives said optical element moving mechanism to adjust a position of the selected optical element after the switching so that the chromatic information of the image acquired before switching of said optical elements is equivalent to the chromatic information of the image acquired after switching of the optical elements.

6. An optical element switching device, comprising:

an optical element turret rotatably mounted at a base portion of a main body of said optical element switching device, and loaded with a plurality of optical elements;

an optical element turret driving mechanism for driving said optical element turret to rotate by voltage application and selecting one of said plurality of optical elements;

a plurality of guide mechanisms, mounted on said optical element turret, for guiding said plurality of optical elements respectively so that each of said plurality of optical elements can be moved linearly;

a returning member for applying an urging force to each of said plurality of optical elements, in a direction of linear movement of said optical elements guided by said guide mechanisms;

an optical element moving mechanism mounted at the base portion of the main body of said optical element switching device, said optical element moving mechanism comprising a pressurizing member for moving said selected optical element, against the urging force of said returning member, in a direction of the linear movement of said selected optical element guided by a respective one of said guide mechanisms and also comprising a motor for moving said pressurizing member; and a control unit for controlling rotation of said revolver driving mechanism and said optical element turret driving mechanism, and extension of said shaft executed by said optical element moving mechanism.

7. An optical element switching device according to claim 6, wherein each of said plurality of guide mechanisms mounted on said optical element turret has a referential position; and when said selected optical element is switched to another one of said optical elements, said control unit controls said pressurizing member of said optical element moving mechanism to retreat to a limit position so that said selected optical element returns to said referential position, and then controls said optical element turret driving mechanism to rotate said optical element turret.

8. An optical element switching device according to claim 7, wherein said control unit stores a distance of movement of said pressurizing member in said optical element moving mechanism to said referential position to which said selected optical element returns when said selected optical element is switched, in accordance with a kind of said selected optical element; and after switching of said selected optical element by the rotation of said optical element turret, said control unit reads the distance of movement of said pressurizing member corresponding to a newly selected optical element and moves said pressurizing member said distance of movement so that the position of the previously selected optical element is automatically reproduced.

9. An optical element switching device constituted integrally with an objective switching device for switching any one of a plurality of objectives, said optical element switching device comprising:

a revolver rotatably mounted at a base portion of a main body of said optical element switching device and loaded with said plurality of objectives;

a revolver driving mechanism for driving said revolver to rotate by voltage application and for arranging a selected one of said objectives along an optical path of light from a specimen to be observed;

an optical turret, mounted at the base portion of the main body of said optical element switching device and loaded with a plurality of optical elements, for rotating orthogonally to said optical path of the light;

an optical element turret driving mechanism for driving said optical element to rotate by voltage application and for stopping the selected one of said optical elements along said optical path of the light;

a plurality of guide mechanisms, mounted on said optical element turret, for guiding said plurality of optical elements respectively so that each of said plurality of optical elements can be moved linearly;

a plurality of springs for urging said plurality of optical elements respectively in a direction of linear movement of said optical elements guided by said guide mechanisms;

an optical element moving mechanism mounted at the base portion of the main body of said optical element switching device, said optical element moving mechanism comprising a shaft for pushing said selected optical element stopped along said optical path of the light, against the urging force of a respective one of said springs, in a direction of the linear movement of said selected optical element guided by a respective one of said guide mechanisms and also comprising a linear stepping motor for extending said shaft; and a control unit for controlling rotations of said revolver driving mechanism and said optical element turret driving mechanism, and extension of said shaft executed by said optical element moving mechanism.

* * * * *